US010268684B1

(12) United States Patent
Denkowski et al.

(10) Patent No.: US 10,268,684 B1
(45) Date of Patent: Apr. 23, 2019

(54) OPTIMIZED STATISTICAL MACHINE TRANSLATION SYSTEM WITH RAPID ADAPTATION CAPABILITY

(71) Applicant: Amazon Technologies, Inc., Seattle, WA (US)

(72) Inventors: Michael Denkowski, Pittsburgh, PA (US); Alon Lavie, Pittsburgh, PA (US); Gregory Alan Hanneman, Pittsburgh, PA (US); Matthew Ryan Fiorillo, Pittsburgh, PA (US); Laura Josephine Kieras, Pittsburgh, PA (US); Robert Thomas Olszewski, Pittsburgh, PA (US); William Joseph Kaper, Pittsburgh, PA (US); Alexandre Alexandrovich Klementiev, Berlin (DE); Gavin Richard Jewell, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 222 days.

(21) Appl. No.: 14/868,166

(22) Filed: Sep. 28, 2015

(51) Int. Cl.
*G06F 17/28* (2006.01)
*G06F 17/24* (2006.01)

(52) U.S. Cl.
CPC .......... *G06F 17/2818* (2013.01); *G06F 17/24* (2013.01); *G06F 17/289* (2013.01); *G06F 17/2854* (2013.01)

(58) Field of Classification Search
CPC .................................................. G06F 17/2818
(Continued)

(56) References Cited

U.S. PATENT DOCUMENTS 5,510,981 A * 4/1996 Berger ................ G06F 17/2827
704/2
5,850,627 A 12/1998 Gould et al.
(Continued)

FOREIGN PATENT DOCUMENTS

EP 2226733 8/2010
EP 2317447 5/2011
WO WO2006016171 2/2006

OTHER PUBLICATIONS

C.-C. Chang and C.-J. Lin. "LIBSVM : a Library for Support Vector Machines". ACM Transactions on Intelligent Systems and Technology, 2:27:1-27:27, 2011.
(Continued)

*Primary Examiner* — Michael N Opsasnick
(74) *Attorney, Agent, or Firm* — Lee & Hayes, P.C.

(57) ABSTRACT

Technologies are disclosed herein for statistical machine translation. In particular, the disclosed technologies include extensions to conventional machine translation pipelines: the use of multiple domain-specific and non-domain-specific dynamic language translation models and language models; cluster-based language models; and large-scale discriminative training. Incremental update technologies are also disclosed for use in updating a machine translation system in four areas: word alignment; translation modeling; language modeling; and parameter estimation. A mechanism is also disclosed for training and utilizing a runtime machine translation quality classifier for estimating the quality of machine translations without the benefit of reference translations. The runtime machine translation quality classifier is generated in a manner to offset imbalances in the number of training instances in various classes, and to assign a greater penalty to the misclassification of lower-quality translations as
(Continued)

higher-quality translations than to misclassification of higher-quality translations as lower-quality translations.

23 Claims, 18 Drawing Sheets

(58) Field of Classification Search
USPC .................................................. 704/9, 10
See application file for complete search history.

(56) References Cited

U.S. PATENT DOCUMENTS

| | | | |
|---|---|---|---|
| 6,092,043 A | 7/2000 | Squires et al. | |
| 6,275,789 B1 | 8/2001 | Moser et al. | |
| 6,868,381 B1 | 3/2005 | Peters et al. | |
| 7,526,503 B2* | 4/2009 | Bernstein | G06F 17/30587 |
| 7,860,706 B2 | 12/2010 | Abir | |
| 8,229,728 B2 | 7/2012 | Huang et al. | |
| 8,380,486 B2 | 2/2013 | Soricut et al. | |
| 8,560,477 B1 | 10/2013 | Petrov et al. | |
| 8,612,203 B2 | 12/2013 | Foster et al. | |
| 8,756,060 B2 | 6/2014 | Mercado | |
| 8,909,573 B2* | 12/2014 | Xie | G06F 17/30672 |
| | | | 706/20 |
| 8,914,279 B1 | 12/2014 | Petrov et al. | |
| 9,026,425 B2* | 5/2015 | Nikoulina | G06F 17/2818 |
| | | | 704/1 |
| 9,323,745 B2* | 4/2016 | Bangalore | G11B 27/105 |
| 9,959,271 B1 | 5/2018 | Goyal et al. | |
| 2003/0105638 A1 | 6/2003 | Taira | |
| 2003/0154071 A1 | 8/2003 | Shreve | |
| 2003/0233235 A1 | 12/2003 | Park | |
| 2005/0137854 A1 | 6/2005 | Cancedda et al. | |
| 2005/0209983 A1 | 9/2005 | MacPherson | |
| 2007/0005337 A1 | 1/2007 | Mount et al. | |
| 2007/0094169 A1 | 4/2007 | Yamada | |
| 2007/0112554 A1 | 5/2007 | Goradia | |
| 2007/0150257 A1 | 6/2007 | Cancedda et al. | |
| 2008/0010056 A1 | 1/2008 | Zhou et al. | |
| 2008/0040095 A1 | 2/2008 | Sinha et al. | |
| 2008/0270112 A1 | 10/2008 | Shimohata | |
| 2009/0063130 A1* | 3/2009 | Moore | G06F 17/2818 |
| | | | 704/4 |
| 2009/0083023 A1* | 3/2009 | Foster | G06F 17/2827 |
| | | | 704/3 |
| 2009/0177460 A1* | 7/2009 | Huang | G06F 17/2818 |
| | | | 704/2 |
| 2009/0299729 A1 | 12/2009 | Quirk et al. | |
| 2009/0326912 A1 | 12/2009 | Ueffing | |
| 2010/0023331 A1 | 1/2010 | Duta et al. | |
| 2010/0030770 A1* | 2/2010 | Cao | G06F 17/30684 |
| | | | 707/708 |
| 2010/0070261 A1 | 3/2010 | Jin et al. | |
| 2010/0082326 A1 | 4/2010 | Bangalore et al. | |
| 2010/0262575 A1 | 10/2010 | Moore et al. | |
| 2011/0082684 A1 | 4/2011 | Soricut et al. | |
| 2011/0137636 A1 | 6/2011 | Srihari et al. | |
| 2011/0225104 A1 | 9/2011 | Soricut et al. | |
| 2011/0246173 A1* | 10/2011 | Li | G06F 17/2827 |
| | | | 704/2 |
| 2011/0282648 A1* | 11/2011 | Sarikaya | G06F 17/2818 |
| | | | 704/7 |
| 2012/0029904 A1* | 2/2012 | Precoda | G10L 15/06 |
| | | | 704/2 |
| 2012/0035915 A1 | 2/2012 | Kitade et al. | |
| 2012/0101804 A1 | 4/2012 | Roth et al. | |
| 2012/0166183 A1 | 6/2012 | Suendermann et al. | |
| 2012/0253783 A1* | 10/2012 | Castelli | G06F 17/2854 |
| | | | 704/3 |
| 2012/0284013 A1* | 11/2012 | Chin | G06F 3/0481 |
| | | | 704/2 |
| 2012/0316862 A1* | 12/2012 | Sultan | G06F 17/2755 |
| | | | 704/4 |
| 2013/0006954 A1 | 1/2013 | Nikoulina et al. | |
| 2013/0030792 A1 | 1/2013 | Zhao et al. | |
| 2013/0103695 A1 | 4/2013 | Rarrick et al. | |
| 2013/0144593 A1* | 6/2013 | Och | G06F 17/2845 |
| | | | 704/2 |
| 2013/0246322 A1* | 9/2013 | De Sousa Webber | |
| | | | G06N 3/0454 |
| | | | 706/18 |
| 2013/0293577 A1 | 11/2013 | Perez et al. | |
| 2013/0346059 A1* | 12/2013 | Brants | G06F 17/2818 |
| | | | 704/2 |
| 2014/0006006 A1 | 1/2014 | Christ | |
| 2014/0019113 A1 | 1/2014 | Wu et al. | |
| 2014/0059030 A1 | 2/2014 | Hakkani-Tur et al. | |
| 2014/0067361 A1* | 3/2014 | Nikoulina | G06F 17/2818 |
| | | | 704/2 |
| 2014/0100843 A1 | 4/2014 | Tanaka | |
| 2014/0114642 A1 | 4/2014 | van den Oever et al. | |
| 2014/0149102 A1 | 5/2014 | Marcu et al. | |
| 2014/0200878 A1 | 7/2014 | Mylonakis et al. | |
| 2014/0207439 A1* | 7/2014 | Venkatapathy | G06F 17/2836 |
| | | | 704/4 |
| 2014/0288913 A1* | 9/2014 | Shen | G06F 17/289 |
| | | | 704/2 |
| 2014/0297252 A1 | 10/2014 | Prasad et al. | |
| 2014/0337007 A1* | 11/2014 | Waibel | G06F 17/289 |
| | | | 704/3 |
| 2014/0358518 A1 | 12/2014 | Wu et al. | |
| 2014/0358524 A1 | 12/2014 | Papula et al. | |
| 2015/0006143 A1 | 1/2015 | Skiba et al. | |
| 2015/0019200 A1 | 1/2015 | Woodward et al. | |
| 2015/0058018 A1 | 2/2015 | Georges et al. | |
| 2015/0106076 A1 | 4/2015 | Hieber et al. | |
| 2015/0278194 A1 | 10/2015 | Terao et al. | |
| 2015/0278197 A1 | 10/2015 | Bogdanova | |
| 2015/0286632 A1* | 10/2015 | Meunier | G06F 17/2854 |
| | | | 704/2 |
| 2015/0293900 A1 | 10/2015 | Saad | |
| 2016/0027333 A1 | 1/2016 | Labutov et al. | |
| 2016/0042053 A1 | 2/2016 | De Sousa Webber | |
| 2016/0124944 A1 | 5/2016 | Andreoli et al. | |
| 2016/0132491 A1 | 5/2016 | Watanabe et al. | |
| 2016/0162473 A1 | 6/2016 | Cogley et al. | |
| 2016/0162477 A1 | 6/2016 | Orsini et al. | |
| 2016/0162575 A1 | 6/2016 | Eck et al. | |
| 2016/0188576 A1 | 6/2016 | Huang | |
| 2016/0267077 A1 | 9/2016 | Bahgat et al. | |
| 2017/0031901 A1 | 2/2017 | Song et al. | |
| 2017/0169015 A1 | 6/2017 | Huang | |
| 2018/0061274 A1 | 3/2018 | Frahling | |

OTHER PUBLICATIONS

Callison-Burch, Chris et al. "Findings of the 2012 Workshop on Statistical Machine Translation" Proceedings of the Seventh Workshop on Statistical Machine Translation. 2012.
Cherry, C. and G. Foster. "Batch Tuning Strategies for Statistical Machine Translation". In Proceedings of the 2012 Conference of the North American Chapter of the Association for Computational Linguistics: Human Language Technologies. Jun. 2012. pp. 427-436.
Crammer, K., O. Dekel, J. Keshet, S. Shalev-Shwartz and Y. Singer. "Online Passive-Aggressive Algorithms". Journal of Machine Learning Research. Issue 7. Mar. 2006. pp. 551-558.
Germann, U. "Dynamic Phrase Tables for Machine Translation in an Interactive Post-editing Scenario". In Proceedings of the AMTA 2014 Workshop on Interactive and Adaptive Machine Translation. Oct. 2014. pp. 20-31.
Heafield, K., I. Pouzyrevsky, J. H. Clark and P. Koehn. "Scalable Modified Kneser-Ney Language Model Estimation". In Proceedings of the 51st Annual Meeting of the Association for Computational Linguistics. Aug. 2013.
Denkowski, M., C. Dyer and A. Lavie. "Learning from Post-Editing: Online Model Adaptation for Statistical Machine Translation". In Proceedings of the 14th Conference of the European Chapter of the Association for Computatio nal Linguistics (EACL-2014), Gothenburg, Sweden, Apr. 26-30, 2014. pp. 395-404.

(56) References Cited

OTHER PUBLICATIONS

Koehn, P., H. Hoang, A. Birch, C. Callison-Burch, M. Federico, N. Bertoldi, B. Cowan, W. Shen, C. Moran, R. Zens, C. Dyer, O. Bojar, A. Constantin and E. Herbst. "Moses: Open Source Toolkit for Statistical Machine Translation". In Proceedings of the 45th Annual Meeting of the Association for Computational Linguistics Companion Volume Proceedings of the Demo and Poster Sessions. Jun. 2007. pp. 177-180.

Office action for U.S. Appl. No. 14/868,083, dated Sep. 21, 2016, Goyal et al., "Optimized Statistical Machine Translation System With Rapid Adaptation Capability", 19 pages.

Office action for U.S. Appl. No. 14/867,932, dated Sep. 26, 2016, Dyer et al., "Optimized Statistical Machine Translation System With Rapid Adaptation Capability", 24 pages.

Denkowski, M., A. Lavie, I. Lacruz and C. Dyer. "Real Time Adaptive Machine Translation for Post-Editing with cdec and TransCenter". In Proceedings of the Workshop on Humans and Computer-assisted Translation at the 14th Conference of the European Chapter of the Association for Computational Linguistics (EACL-2014), Gothenburg, Sweden, Apr. 26, 2014. pp. 72-77.

Snover, Matthew, et al. "A Study of Translation Edit Rate with Targeted Human Annotation." In Proceedings of the 2006 Conference of the Association for Machine Translation in the Americas (AMTA-2006). Oct. 2006.

Specia et al., "Machine translation evaluation versus quality estimation", Machine Translation, vol. 24, May 2010, pp. 39-50.

Denkowski, et al., "Meteor 1.3: Automatic Metric for Reliable Optimization and Evaluation of Machine Translation Systems." Proceedings of the Sixth Workshop on Statistical Machine Translation, pp. 85-91, Edinburgh, Scotland, Jul. 2011.

Office action for U.S. Appl. No. 14/868,083, dated Apr. 13, 2017, Goyal et al., "Optimized Statistical Machine Translation System With Rapid Adaptation Capability", 26 pages.

Office action for U.S. Appl. No. 14/867,932, dated May 25, 2017, Michael Denkowski, "Optimized Statistical Machine Translation System With Rapid Adaptation Capability", 29 pages.

Office action for U.S. Appl. No. 14/868,083, dated Aug. 9, 2017, Goyal et al., "Optimized Statistical Machine Translation System With Rapid Adaptation Capability", 27 pages.

Papineni et al., "BLEU: A Method for Automatic Evaluation of Machine Translation." Proceedings of the 40th Annual Meeting of the Association for Computational Linguistics, pp. 311-318, Philadelphia, Jul. 2002.

Office action for U.S. Appl. No. 14/867,932, dated Nov. 29, 2017, Denkowski, "Optimized Statistical Machine Translation System With Rapid Adaptation Capability", 31 pages.

Office action for U.S. Appl. No. 14/867,932, dated Mar. 14, 2018, Denkowski, "Optimized Statistical Machine Translation System With Rapid Adaptation Capability", 36 pages.

\* cited by examiner

OPTIMIZED STATISTICAL MACHINE TRANSLATION SYSTEM WITH RAPID ADAPTATION CAPABILITY

STATEMENT REGARDING FEDERALLY SPONSORED RESEARCH OR DEVELOPMENT

This invention was made with Government support under grant agreement number NSF IIP-1150589 awarded by the National Science Foundation. The Government has certain rights in this invention.

BACKGROUND

Statistical machine translation systems generate translations on the basis of statistical models derived from an analysis of bilingual text. In particular, text segments can be translated based upon a probability distribution that a segment in a target language (e.g. Spanish) is a translation of a segment in a source language (e.g. English). While conventional statistical machine translations can provide translations of a reasonable quality, there remains room for improvement in the quality of translations generated by such systems.

Additionally, in some use cases for statistical machine translation systems, additional training data can become available after the machine translation system has been trained and deployed for use in translating text. In these use cases, the additional training data can be utilized to retrain the machine translation system. Conventional statistical machine translation systems can, however, require a significant amount of time to retrain with additional training data.

The disclosure made herein is presented with respect to these and other considerations.

DETAILED DESCRIPTION

Figure 1:
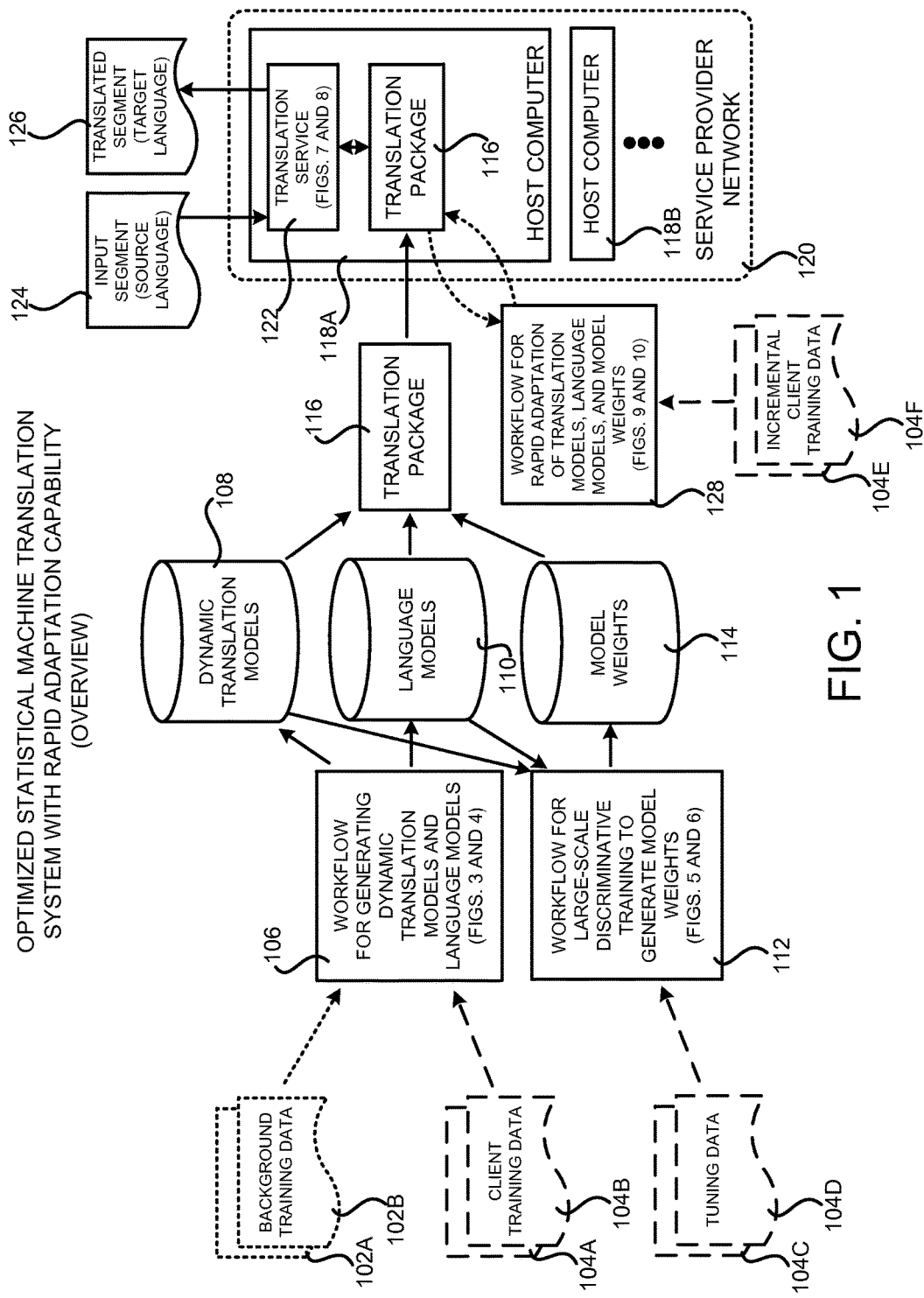
FIG. 1 is a system architecture diagram showing an overview of the configuration and operation of an optimized machine learning system presented herein that is configured with rapid adaptation capabilities, according to one configuration disclosed herein.

The following detailed description is directed to technologies for optimized statistical machine translation. Through an implementation of the disclosed technologies, an optimized machine translation system can be provided that has a higher translation quality and runtime search efficiency than conventional statistical machine translation systems. Moreover, a statistical machine translation system implemented utilizing the technologies disclosed herein can also be retrained utilizing incremental client training data more quickly than previous conventional statistical machine translation systems, thereby improving translation quality. Additional technical benefits other than those described briefly above can also be realized through an implementation of the technologies disclosed herein.

In order to enable the functionality disclosed herein, a statistical machine translation system is provided that includes several extensions to conventional machine translation pipelines: the use of multiple domain-specific and non-domain-specific dynamic translation models and language models; cluster-based language models; and/or large-scale discriminative training. For example, in one particular configuration, the statistical machine translation system is configured to utilize domain-specific client (i.e. in-domain) training data in a source language and a target language to generate a dynamic client data translation model. The statistical machine translation system can also utilize non-domain-specific (i.e. out-of-domain) background training data in the source and target languages to generate a dynamic background data translation model. The client and background data dynamic translation models are implemented utilizing suffix array data structures in one particular configuration.

The disclosed statistical machine translation system can also utilize the domain-specific client training data in the target language to generate a client language model and utilize the non-domain-specific background training data in the target language to generate a background language model. In some configurations, a combined translation model is also generated utilizing both the client training data and the background training data.

In some configurations, the disclosed statistical machine translation system is also configured to generate and utilize a cluster-based language model. For example, and without limitation, the statistical machine translation system can utilize the domain-specific client training data in the target language and the non-domain-specific background training data in the target language to generate a cluster map for the target language. In some configurations, the cluster map is generated utilizing Brown clustering, which will be described in detail below. The cluster map can then be utilized to generate a cluster-based language model for the target language. A combined cluster-based language model can also be generated and utilized in some configurations.

Once the translation and language models have been generated, large-scale discriminative training can be performed utilizing additional domain-specific client training data to learn model weights for feature scores generated by the translation and language models. The feature scores indicate how likely a translation is based upon the data that the model utilized to perform the translation was trained upon. In one particular configuration, for example, a margin infused relaxed algorithm ("MIRA") is utilized to generate model weights for the dynamic client data translation model, the dynamic background data translation model, the client language model, the background language model, and the cluster-based language model and combined translation model, if utilized. The MIRA algorithm can also be utilize other feature scores from source other than language and translation models (e.g. reordering, output length, etc.). As will be described in greater detail below, the model weights can be utilized to weight the contributions from the various translation and language models and, potentially, from other features.

Once the translation models, language models, and model weights have been generated, a translation package can be created that includes the dynamic client data translation model, the dynamic background data translation model, the client language model, the background language model, and the model weights. If a cluster-based language model and a combined translation model are utilized, these models can also be included in the translation package. The translation package can be implemented as a software container, for instance, that can be utilized to translate input segments in the source language into the target language. Once the translation package has been created, it can be deployed for use in performing translations. For example, and without limitation, the translation package can be deployed to host computers in a service provider network for use by a translation service capable of translating input segments in the source language to the target language.

When a request is received to translate a segment from the source language to the target language, the dynamic client data translation model is utilized to generate one or more candidate translations for phrases in the input segment. Similarly, the dynamic background data translation model can also be utilized to generate one or more candidate translations for phrases in the input segment. A combined translation model, if utilized, can also generate one or more candidate translations for phrases in the input segment. Each of the candidate translations has one or more associated feature scores.

Once the candidate translations have been generated, the client language model, the background language model, and the cluster-based language model, if utilized, can also generate feature scores for the candidate translations. The model weights generated using large-scale discriminative training (e.g. MIRA) can then be used to generate weighted feature scores. The weighted feature scores can then be utilized to select a combination of the candidate translations which, when combined, form a translation of the input segment.

The statistical machine learning system disclosed herein can also be implemented with incremental update technologies for use in quickly updating the statistical machine translation system in four areas: word alignment; translation modeling; language modeling; and parameter estimation. For example, in one particular configuration, a batch of incremental client training data is received following the generation and deployment of a translation package in the manner described above. As one particular example, translations generated by the translation package that have been post-edited can be utilized as incremental client training data. Incremental client training data can also be received from other sources. The incremental client training data can also be utilized to update a combined translation model, if utilized.

In one configuration, word alignment is performed on the incremental client training data utilizing a word alignment model created during the initial generation and deployment of the translation package. In this manner, the word alignment model does not need to be re-learned in order to word align the new training data, thereby reducing the time required to update the statistical machine translation system as compared to previous conventional statistical machine translation systems.

According to another aspect, the incremental client training data can be added to the previously generated dynamic client data translation model to create an updated dynamic client data translation model. For example, and without limitation, when a suffix array data structure is utilized to store the dynamic client data translation model, the incremental client training data can be indexed and stored in the suffix array data structure. The incremental client training data can also be utilized to generate an updated client language model and an updated cluster-based language model.

Large-scale discriminative training can also be utilized to generate updated model weights for the updated dynamic client data translation model, the updated cluster-based language model, and the updated client language model. For example, and without limitation, the MIRA algorithm can be utilized to generate updated model weights utilizing a fewer number of iterations than required to generate the initial model weights. An updated translation package can then be created that includes the updated dynamic client data translation model, the updated cluster-based language model, the updated client language model, and the updated model weights.

In some configurations, comparative testing is performed between the earlier version of the translation package and the updated translation package. The updated translation package can then be deployed, such as within a service provider network, in place of the previously deployed translation package based upon the results of the testing. For example, and without limitation, the updated translation package is deployed in one configuration if the quality of the translations it provides are as good as or better than translations generated by the previously deployed translation package. Rapid adaptation of the disclosed statistical machine translation system with incremental client training data in the manner described briefly above and more fully below can also result in higher quality translations.

A mechanism is also disclosed for training and utilizing a run time (which might also be referred to herein as "translation time") machine translation quality classifier for estimating the quality of machine translations generated by the disclosed machine translation system in real or near-real time without the benefit of reference translations. The run-time machine translation quality classifier is generated in a manner to offset imbalances in the number of training instances in various classes of training data, and to more greatly penalize the misclassification of a lower-quality translation as a higher-quality translation than the misclassification of a higher-quality translation as a lower-quality translation. Additional details regarding the various components and processes described briefly above for optimized statistical machine translation will be presented below with regard to FIGS. 1-17.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, hand-held computers, personal digital assistants, e-readers, mobile telephone devices, tablet computing devices, special-purposed hardware devices, network appliances, and the like.

As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a system architecture diagram showing an overview of the configuration and operation of a machine learning system presented herein that is configured with rapid adaptation capabilities, according to one configuration disclosed herein. As discussed briefly above, the system described herein can be utilized to create a translation package 116 that can be utilized by a translation service 122 to translate an input segment 124, or segments, expressed in a source language (e.g. English) to a translated segment 126, or segments, in a target language (e.g. Spanish).

In order to generate the translation package 116, a workflow 106 is performed for generating dynamic translation models 108 for the source and target languages, and for generating language models for the target language. The workflow 106 takes non-domain-specific background training data 102 as input. The background training data 102A, for example, may be a collection of sentences or paragraphs expressed in the source language, and the background training data 102B may be the same collection of sentences or paragraphs that have been expressed in the target language.

In a similar fashion, the workflow 106 also takes as input in-domain client training data 104. As with the background training data 102, the client training data 104A may be a collection of sentences or paragraphs expressed in the source language, and the client training data 104B may be the same collection of sentences or paragraphs that have been expressed in the target language. In one specific implementation, the non-domain-specific background training data 102 is translations of books and the in-domain client training data 104 are product descriptions for products offered through an e-commerce merchant. Other types of in-domain and out-of-domain training data can be utilized in other configurations.

As shown in FIG. 1, the output of the workflow 106 is one or more dynamic translation models 108 for translating between the source and target languages, and one or more language models 110 for the target language. Additional details regarding the workflow 106 for generating the dynamic translation models 108 and the language models 110 are provided below with regard to FIGS. 3 and 4.

In order to generate the translation package 116, a workflow 112 is also executed for performing large-scale discriminative training to generate model weights 114 for the dynamic translation models 108 and the language models 110. In one configuration, the margin relaxed infused algorithm ("MIRA") is utilized to perform the large-scale discriminative training. Other algorithms can also be utilized in other configurations.

As illustrated in FIG. 1, the workflow 112 takes additional in-domain client tuning data 104C and 104D as input. The additional in-domain client tuning data 104C and 104D can include sentences, paragraphs, or other phrases in the source and target languages that were not included in the client training data 104A and 104B. Additionally, the additional in-domain client tuning data 104C and 104D may include text of a type that is similar to the input segments 124 that will be encountered during production use of the machine translation system shown in FIG. 1. Additional details regarding the generation of the model weights 114 will be provided below with regard to FIGS. 5 and 6.

Once the model weights 114 have been generated, the dynamic translation models 108, the language models 110, and the model weights 114 are added to the translation package 116. The translation package 116 can then be deployed to one or more host computers 118A-118B in a service provider network 120 in one particular configuration. The service provider network 120 is a computing network configured to provide computing resources on a permanent or an as-needed basis. Among other types of functionality, the computing resources provided by the service provider network 120 can be utilized to implement the various network services described herein, such as the translation service 122. The computing resources provided by the service provider network 120 can include various types of computing resources, such as data processing resources like virtual machine ("VM") instances, data storage resources, networking resources, data communication resources, network services, and the like.

A customer or potential customer of the service provider network 120 can utilize an appropriate computing system (not shown in FIG. 1) to communicate with the service provider network 120 over an appropriate data communications network (also not shown in FIG. 1). In this way, a customer of the service provider network 120 can configure various aspects of the operation of the computing resources provided by the service provider network 120, or to otherwise control any computing resources being utilized by the customer.

For example, and without limitation, a computing system utilized by a customer of the service provider network 120 can be utilized to purchase computing resources in the service provider network 120, to configure aspects of the operation of the computing resources through a management console (not shown in FIG. 1) or other type of interface, to access and utilize functionality provided by the various services and systems described herein, and/or to perform other types of functionality with regard to the operation of the computing resources provided by the service provider network 120. Additional details regarding the configuration and operation of the service provider network 120 will be provided below with regard to FIGS. 14-17. In this regard, it should be appreciated that the service provider network 120 represents but one operating environment for the technologies disclosed herein and that other computing environments can be utilized to implement the statistical machine learning system disclosed herein.

As discussed briefly above, the service provider network 120 can also be configured to execute various types of network services. For example, and without limitation, the service provider network 120 can execute the translation service 122 shown in FIG. 1. As discussed briefly above, the translation service 122 is a network service that executes in the service provider network 120 in one particular configuration. The translation service 122 exposes an interface, such as a Web services interface, through which callers can request translation of an input segment 124 in a source language to a translated segment 126 in a target language. In response to receiving such a request, the translation service 122 is configured to utilize the dynamic translation models 108, the language models 110, and the model weights 114 contained in the translation package 116 to perform the requested translation. Additional details regarding the operation of the translation service 122 will be provided below with regard to FIGS. 7 and 8.

In one particular configuration, a workflow 128 can also be performed for rapid adaptation of the dynamic translation models 108, the language models 110, and the model weights 114. In order to perform rapid adaption of these components, the workflow 128 takes as input incremental in-domain client training data 104E-104F. For example, translations generated by the statistical machine translation system shown in FIG. 1 might be post-edited by human translators to ensure that they are accurate translations of the associated input segment. The input segments and their corresponding post-edited translations can then be utilized as the incremental client training data 104E-104F for use in rapidly adapting the dynamic translation models 108, the language models 110, and the model weights 114.

In one particular configuration, the machine translated segments 126 can be presented to users of a Web site, such as an e-commerce site. For example, and without limitation, an appropriate UI can be presented to users of an e-commerce site that include machine translated segments 126 of product or service descriptions or related content. The UI can also provide UI controls to query the user as to whether the translation appears correct and, if not, to provide the correct translation. The human post-edited translations can then be utilized as the incremental client training data 104E-104F for use in rapidly adapting the dynamic translation models 108, the language models 110, and the model weights 114 in the manner described above. In this regard, it should be appreciated that other types of UIs can be utilized in other environments for obtaining human post-edited translations for use as the incremental client training data 104.

The workflow 128 can also generate an updated translation package and deploy the updated translation package to the service provider network 120 in place of a previous version of the translation package 116. Additional details regarding the workflow 128 for performing rapid adaptation of the dynamic translation models 108, the language models 110, and the model weights 114 will be provided below with regard to FIGS. 9 and 10.

As described briefly above, technologies are also disclosed for training and utilizing a runtime machine translation quality classifier (not shown in FIG. 1) for estimating the quality of machine translated segments 126 generated by the machine translation system shown in FIG. 1 without the benefit of reference translations. The runtime machine translation quality classifier is generated in a manner to offset imbalances in the number of training instances in various classes, and to more greatly penalize the misclassification of a lower-quality translation as a higher-quality translation than the misclassification of a higher-quality translation as a lower-quality translation. Additional details regarding this mechanism will be provided below with regard to FIGS. 11-13.

It should be appreciated that the workflows 106 and 112 are implemented in one particular configuration utilizing the open-source DUCTTAPE workflow management system. Additional software components can then be utilized to encapsulate the resulting language models 110, translation models 108, model weights 114, and other components into a translation package 116, such as a software container, that can be deployed into a production environment, such as the service provider network 120. Once deployed, the translation package 116 can be utilized to respond to translation requests received from service clients.

It should also be appreciated that the various models shown in FIG. 1 are merely illustrative and that other models and their associated model weights can be utilized in a similar manner to that described herein. For example, and without limitation, one or more reordering models (not shown in FIG. 1) are also utilized in some configurations. In other configurations, multiple domain-specific models can be utilized. Other configurations can also be utilized without departing from the spirit and scope of the disclosure presented herein.

Figure 2:
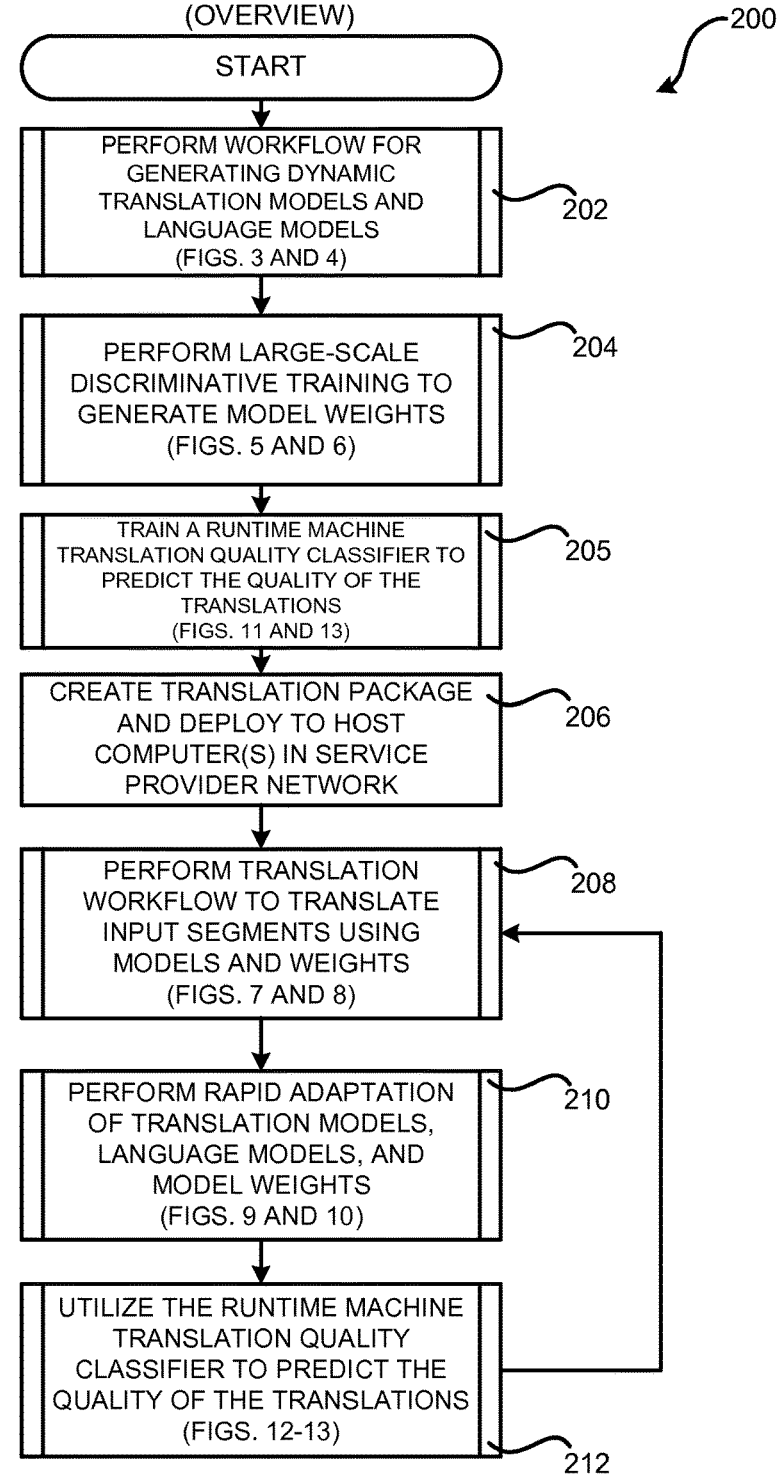
FIG. 2 is a flow diagram showing a routine that illustrates further aspects of the operation of the optimized machine learning system shown in FIG. 1, according to one particular configuration disclosed herein.

FIG. 2 is a flow diagram showing a routine 200 that illustrates further aspects of the operation of the machine learning system shown in FIG. 1, according to one particular configuration disclosed herein. It should be appreciated that the logical operations described herein with respect to FIG. 2, and the other FIGS., can be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special-purpose digital logic, and any combination thereof. It should also be appreciated that more or fewer operations can be performed than shown in the FIGS. and described herein. These operations can also be performed in parallel, or in a different order than those described herein. Some or all of these operations might also be performed by components other than those specifically identified.

The routine 200 begins at operation 202, where the workflow 106 is performed for generating the dynamic translation models 108 and the language models 110. Additional details regarding the workflow 106 will be provided below with regard to FIGS. 3 and 4. From operation 202, the routine 200 proceeds to operation 204, where the workflow 112 is performed for utilizing large-scale discriminative training to generate the model weights 114 for the dynamic translation models 108 and the language models 110. Additional details regarding this process will be provided below with regard to FIGS. 5 and 6.

From operation 204, the routine 200 proceeds to operation 205, where a runtime machine translation quality classifier for estimating the quality of machine translations generated by the machine translation system shown in FIG. 1 can be trained in the manner described below with regard to FIGS. 11 and 13. The routine 200 then proceed to operation 206, where the dynamic translation models 108, the language models 110, the model weights 114, and potentially the runtime machine translation quality classifier are added to the translation package 116. The translation package 116 can then be deployed, such as to a host computer 118 in the service provider network 120 for example. Once the translation package 116 has been deployed, the translation service 122 can utilize the dynamic translation models 108, language models 110, and model weights 114 in the translation package 116 to translate input segments 124. Additional details regarding the contents and use of the translation package 116 will be provided below with regard to FIGS. 7 and 8.

From operation 208, the routine 200 proceeds to operation 210, where the workflow 128 can be performed for rapid adaptation of the dynamic translation models 108, the language models 110, and the model weights 114. Once the dynamic translation models 108, the language models 110, and the model weights 114 have been updated, an updated translation package 116 can be deployed in place of the previous version of the translation package 116. The updated translation package can then be utilized by the translation service 122 to translate input segments 124. Additional details regarding the workflow 128 for rapid adaptation will be provided below with regard to FIGS. 9 and 10.

From operation 210, the routine 200 proceeds to operation 212, where the runtime machine translation quality classifier can be utilized to predict the quality of the translated segments 126 generated by the translation service 122. Additional details regarding the training and utilization of the runtime machine translation quality classifier will be provided below with regard to FIGS. 11-13. From operation 212, the routine 200 proceeds back to operation 208, where translations can continue to be performed at operation 208, where the workflow 128 for rapid adaptation can be periodically performed at operation 210, and where the quality of translated segments 126 can be determined at operation 212.

Figure 3:
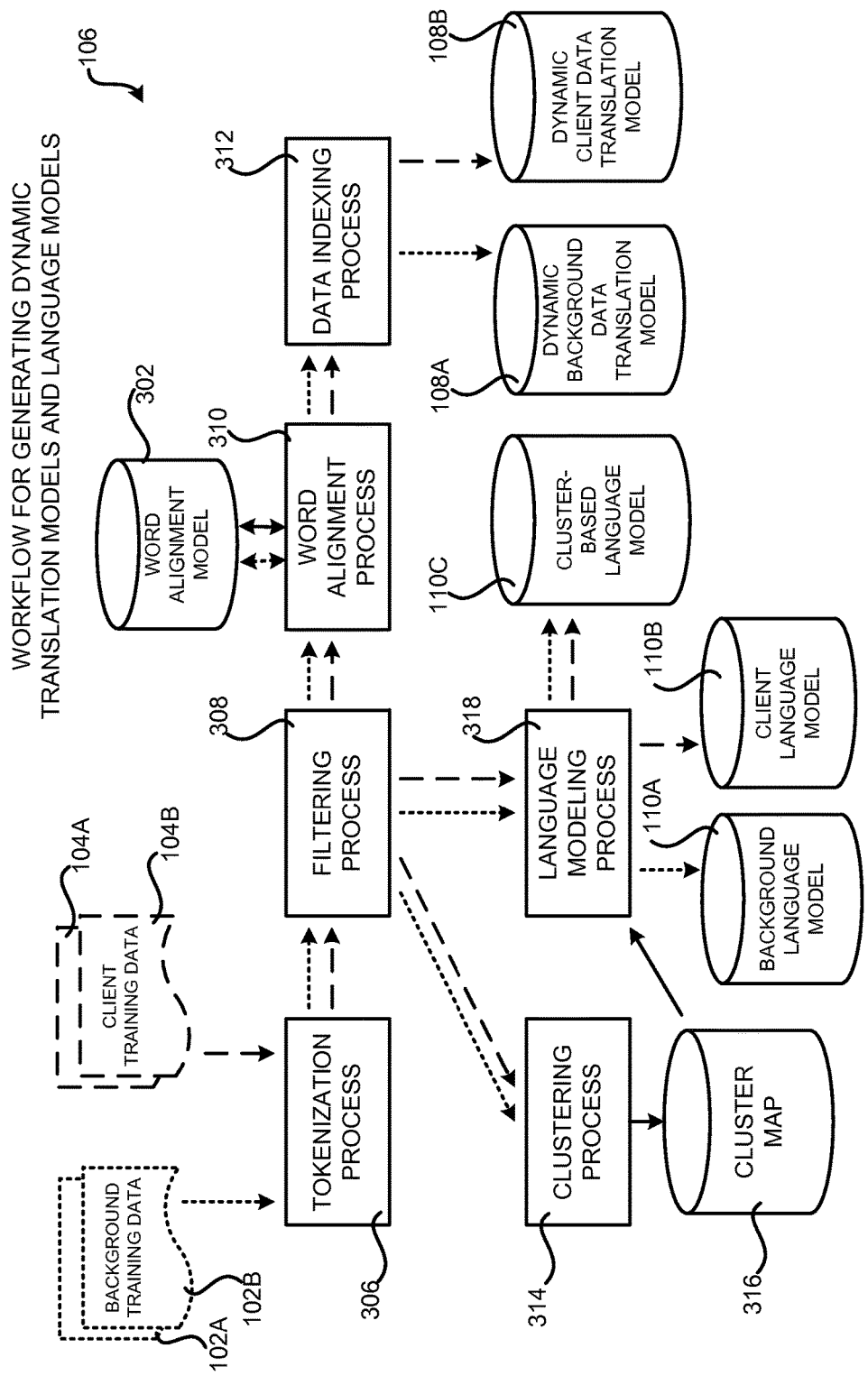
FIG. 3 is a system architecture diagram showing aspects of the operation of the machine learning system shown in FIG. 1 for generating dynamic translation models and language models, according to one configuration disclosed herein.

FIG. 3 is a system architecture diagram showing aspects of the operation of the workflow 106 shown in FIG. 1 for generating dynamic translation models 108 and language models 110, according to one configuration disclosed herein. As discussed briefly above, the workflow 106 takes as input non-domain-specific background training data 102. The background training data 102A, for example, may be a collection of sentences or paragraphs expressed in the source language, and the background training data 102B may be the same collection of sentences or paragraphs that have been expressed in the target language. The background training data 102A and 102B may be referred to herein collectively as "background training data 102."

In a similar fashion, the workflow 106 also takes as input in-domain client training data 104. As with the background training data 102, the client training data 104A may be a collection of sentences or paragraphs expressed in the source language, and the client training data 104B may be the same collection of sentences or paragraphs that have been expressed in the target language. The client training data 104A and 104B may be referred to herein collectively as "client training data 104." The dotted lines in FIG. 3 represent the flow of the background training data 102 while the dashed lines represent the flow of the client training data 104.

The first step of the workflow 106 illustrated in FIG. 3 is the tokenization process 306. The tokenization process 306 tokenizes both the background training data 102 and the client training data 104 by breaking the text into discrete units. For example, and without limitation, the tokenization process 306 can separate punctuation characters, perform normalization on the text, and break apart contractions. The tokenized background training data 102 and client training data 104 is then provided to the filtering process 308.

The filtering process 308 removes text from the tokenized background training data 102 and the client training data 104 that is not suitable for inclusion in the dynamic translation models 108 or for use in training the language models 110. For example, and without limitation, the filtering process 308 might remove very long sentences that are not useful for creating the language models 110. Similarly, the filtering process 308 can remove mismatched sentences that are not appropriate for use in the dynamic translation models 108. Other types of filtering can be performed. The tokenized and filtered background training data 102 and client training data 104 is then provided to the word alignment process 310. The tokenized and filtered background training data 102 and client training data 104 in the target language is also provided to the language modeling process 318 and the clustering process 314. Each of these processes is described in detail below.

The word alignment process 310 utilizes unsupervised machine learning to learn a word alignment model 302 describing word-level correspondences between the training data in the source language and the training data in the target language. For example, and without limitation, the word alignment process 310 can learn word-level correspondences between the out-of-domain background training data 102A in the source language and the background training data 102B in the target language. Similarly, the word alignment process 310 can learn word-level correspondences between the in-domain client training data 104A in the source language and the client training data 104B in the target language. The word alignment model 302 can be saved for use during the rapid retraining process described below with regard to FIGS. 9 and 10. The tokenized, filtered, and word-aligned background training data 102 and client training data 104 is then provided to the data indexing process 312.

The data indexing process 312 indexes the tokenized, filtered, and word-aligned background training data 102 to create a dynamic background data translation model 108A. The data indexing process 312 also indexes the tokenized, filtered, and word-aligned client training data 104 to create a dynamic client data translation model 108B. In some configurations, a combined translation model (not shown in FIG. 3) is generated using both the background training data 102 and the client training data 104.

The indexed background training data 102 and client training data 104 stored in the dynamic background translation model 108A and the dynamic client data translation model 108B, respectively, can be searched at translation time to generate candidate translations of phrases in an input segment 124. In one particular implementation, the translation models 108 are implemented utilizing suffix array data structures. Other data structures can be utilized in other configurations to index the background training data 102 and the client training data 104 in a manner suitable for efficient searching at run time. As will also be described in greater detail below, incremental background and client training data can be added to the dynamic background translation model 108A and the dynamic client data translation model 108B, respectively, without rebuilding the entire index. Details regarding this process are provided below with regard to FIGS. 9 and 10.

As discussed briefly above, the tokenized and filtered background training data 102 and client training data 104 in the target language is also provided to the language modeling process 318. The language modeling process 318 utilizes the background training data 102 to generate a background language model 110A for the target language. The language modeling process 318 also utilizes the client training data 104 to generate a client language model 110B for the target language. In some configurations, the language modeling process 318 also generates a combined language model (not shown in FIG. 3) for the target language utilizing both the background training data 102A and the client training data 102B. As will be described in greater detail below, the background language model 110A, the client language model 110B, and the combined language model, if utilized, can generate feature scores for different attributes of the translations generated by the statistical machine translation system described herein.

As also discussed briefly above, the tokenized and filtered background training data 102 and client training data 104 in the target language is also provided to the clustering process 314. The clustering process 314 first creates a cluster map 316 by assigning each word in the target language to a cluster, a group of words that occur in similar contexts. In one particular implementation, for example, the Brown clustering algorithm is utilized to cluster the words in the tokenized and filtered background training data 102 and client training data 104 in the target language. As known to those skilled in the art, Brown clustering is an agglomerative, bottom-up form of clustering that groups words (i.e., types) into a binary tree of classes using a merging criterion based on the log-probability of a text under a class-based language model (i.e. a probability model that takes the clustering into account). Details regarding one particular implementation of the Brown hierarchical word clustering algorithm in the C++ programming language can be found at http://cs.stanford.edu/~pliang/and https://github.com/percyliang/brown-cluster, both of which are incorporated herein by reference in their entirety.

Using the Brown clustering algorithm, monolingual text can be examined to identify words that tend to be used in the same way and appear in the same context. These words can then be mapped to the same cluster. The words in the background training data 102 and client training data 104 in the target language can then be replaced by unique cluster identifiers ("IDs") for the clusters they have been mapped to. A language model can then be built over the sequences of cluster IDs, as described in greater detail below.

Once the cluster map 316 has been established, a statistical cluster-based language model 110C is trained by mapping the target-language words in the language model training data to a cluster. As discussed above, the cluster-based language model 110C is then trained on the resulting cluster sequences. In one particular implementation, the cluster-based language model 110C is generated using the open-source KENLM language model generating tool. Additional details regarding the KENLM language model generating tool can be found at https://kheafield.com/code/kenlm/.

It should be appreciated that other language model generation tools or toolkits can be utilized in other configurations. In this regard, it should also be appreciated that while a single cluster-based language model 110C is shown in FIG. 3, multiple cluster-based language models can be utilized in other configurations. For example, separate cluster-based language models can be generated utilizing the background training data in the target language and the client training data in the target language. Other configurations can also be utilized. In this regard, it should also be appreciated that the open-source KENLM language model generating tool can also be utilized to generate the other language models described herein. Other language model generating tools and toolkits can also be utilized in other configurations.

As will be described in greater detail below, a run time capability for mapping lexical tokens to their appropriate word clusters in real time during decoding is also provided. This abstraction permits language models to recognize and statistically model much longer spans of text than previously possible, effectively modeling natural language patterns rather than just "raw" sentences in the language. In practice, this capability nearly doubles the context length that the disclosed statistical machine translation system can reliably use as a source of language model information. In this regard, it should be appreciated that the cluster-based language model 110C can be utilized in addition to the standard lexical-level language models 110A and 110B. Other configurations can also be utilized.

Figure 4:
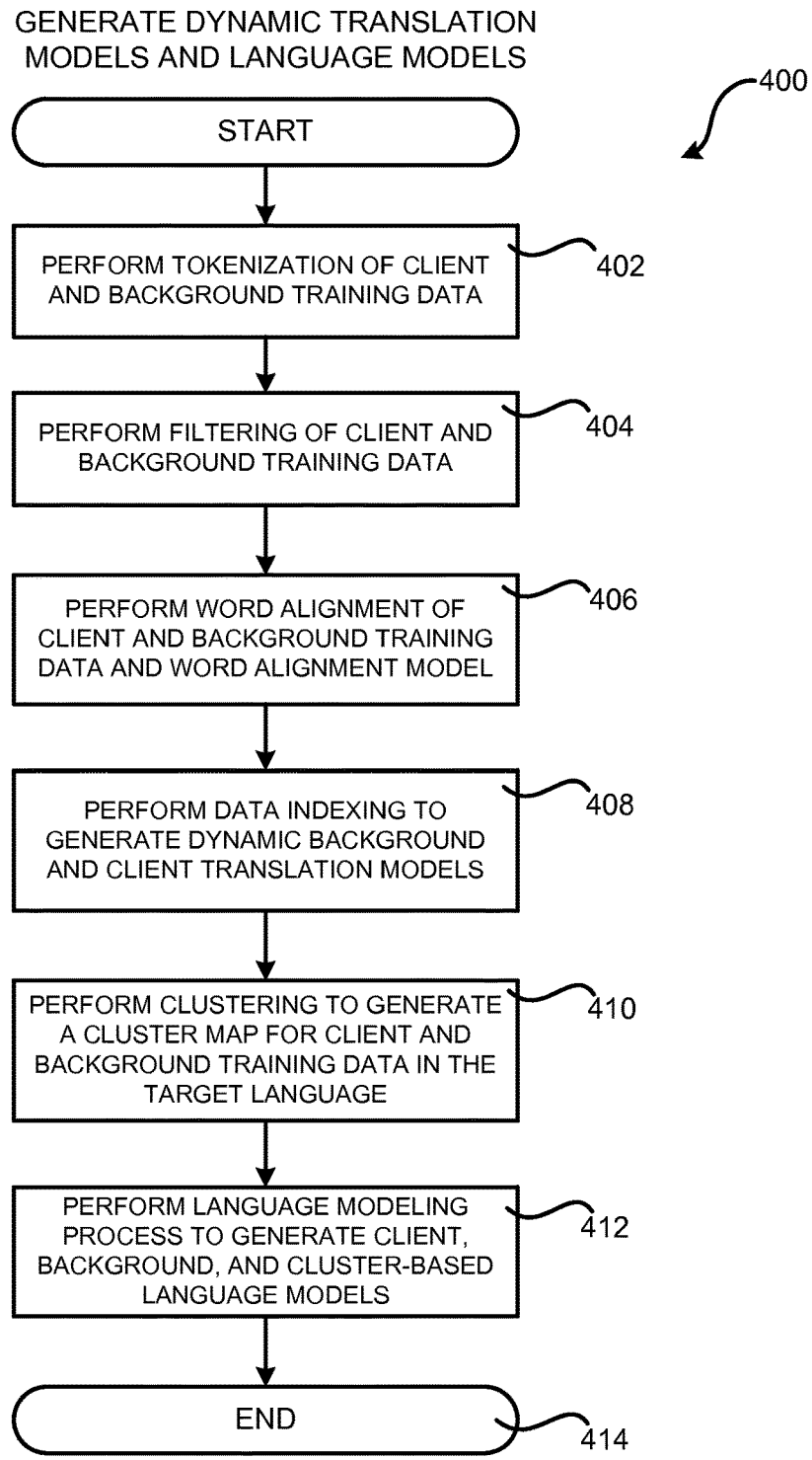
FIG. 4 is a flow diagram showing a routine that illustrates aspects of the operation of the machine learning system shown in FIG. 1 for generating dynamic translation models and language models, according to one configuration disclosed herein.

FIG. 4 is a flow diagram showing a routine 400 that illustrates aspects of the operation of the workflow 106 illustrated in detail in FIG. 3 for generating dynamic translation models 108 and language models 110, according to one configuration disclosed herein. The routine 400 begins at operation 402, where the tokenization process 306 is performed on the background training data 102A-102B and the client training data 104A-104B. The routine 400 then proceeds from operation 402 to operation 404, where the filtering process 308 is performed on the tokenized background training data 102A-102B and the client training data 104A-104B. The routine 400 then proceeds from operation 404 to operation 406.

At operation 406, the word alignment process 310 is performed in order to word align the tokenized and filtered background training data 102A-102B and client training data 104A-104B. Additionally, and as discussed above, the word alignment model 302 is learned at operation 406 and persisted for use in the rapid retraining process described below. From operation 406, the routine 400 proceeds to operation 408.

At operation 408, the data indexing process 312 described above is performed to create the dynamic background data translation model 108A and the dynamic client data translation model 108B. As also discussed above, a combined dynamic translation model (not shown in FIG. 3) is also created in some configurations utilizing both the background training data 102A-102B and the client training data 104A-104B. From operation 408, the routine 400 proceeds to operation 408.

At operation 410, the clustering process 314 is performed in order to generate the cluster map 316. Once the cluster map 316 has been generated, the routine 400 proceeds from operation 410 to operation 412, where the language modeling process 318 utilizes the background training data 102A-102B in the target language to generate the background language model 110A and utilizes the client training data 104A-104B in the target language to generate the client language model 110B. The language modeling process 318 also utilizes the cluster map 316 to generate the cluster-based language model 110C. The routine 400 then proceeds from operation 412 to operation 414, where it ends.

Figure 5:
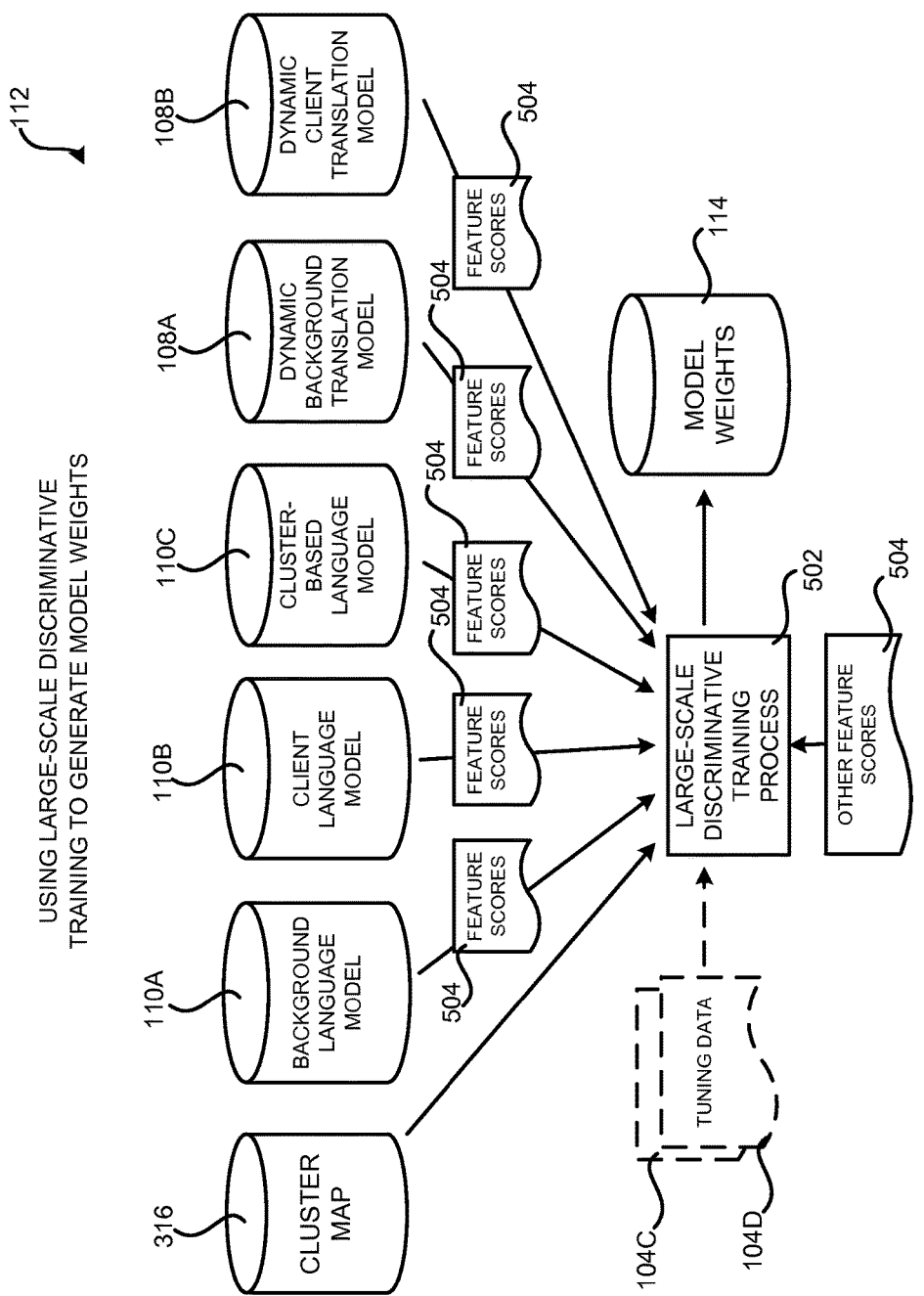
FIG. 5 is a system architecture diagram showing aspects of the operation of the machine learning system shown in FIG. 1 for using large-scale discriminative training to generate model weights, according to one configuration disclosed herein.

FIG. 5 is a system architecture diagram showing aspects of the operation of the workflow 112 shown in FIG. 1 for using large-scale discriminative training to generate model weights 114, according to one configuration disclosed herein. As discussed briefly above, the background language model 110A, the client language model 110B, the cluster-based language model 110C, the dynamic background translation model 108A, and the dynamic client translation model 108B can generate feature scores 504 for candidate translations of phrases in the input segments 124 at translation time. As discussed above, the feature scores 504 indicate how likely a translation is based upon the data that the model utilized to perform the translation was trained upon. Each of the various language and translation models can generate multiple feature scores. Additionally, the feature scores 504 can also include other statistical measures generated by the statistical machine translation system disclosed herein.

Due to the large number of feature scores 504 that are generated by the multiple translation and language models, the traditional line search approach to machine translation system optimization is insufficient. In order to address this consideration, and potentially others, the statistical machine translation system disclosed herein utilizes a large-scale discriminative training process 502 to generate optimized model weights 114 for the various feature scores 504. As mentioned above, in one configuration the MIRA algorithm is utilized to implement the large-scale discriminative training process 502. Other algorithms can also be utilized in other configurations.

As illustrated in FIG. 5, the large-scale discriminative training process 502 takes additional in-domain client tuning data 104C and 104D as input. As mentioned above, the additional in-domain client tuning data 104C and 104D can include sentences, paragraphs, or other phrases in the source and target languages that were not included in the client training data 104A and 104B. Additionally, the additional in-domain client tuning data 104C and 104D may include text of a type that is similar to the input segments 124 that will be encountered during production use of the machine translation system shown in FIG. 1.

The large-scale discriminative training process 502 utilizes the additional client tuning data 104C and 104D and the feature scores 504 generated by the various translation and language models to optimize the model weights 114. The large-scale discriminative training process 502 also utilizes the cluster map 316 to map the additional client data 104 in the target language into clusters. Once the model weights 114 have been generated, they can then be applied to feature scores 504 for phrases in the candidate translations at run time. Additional details regarding this process are provided below.

Figure 6:
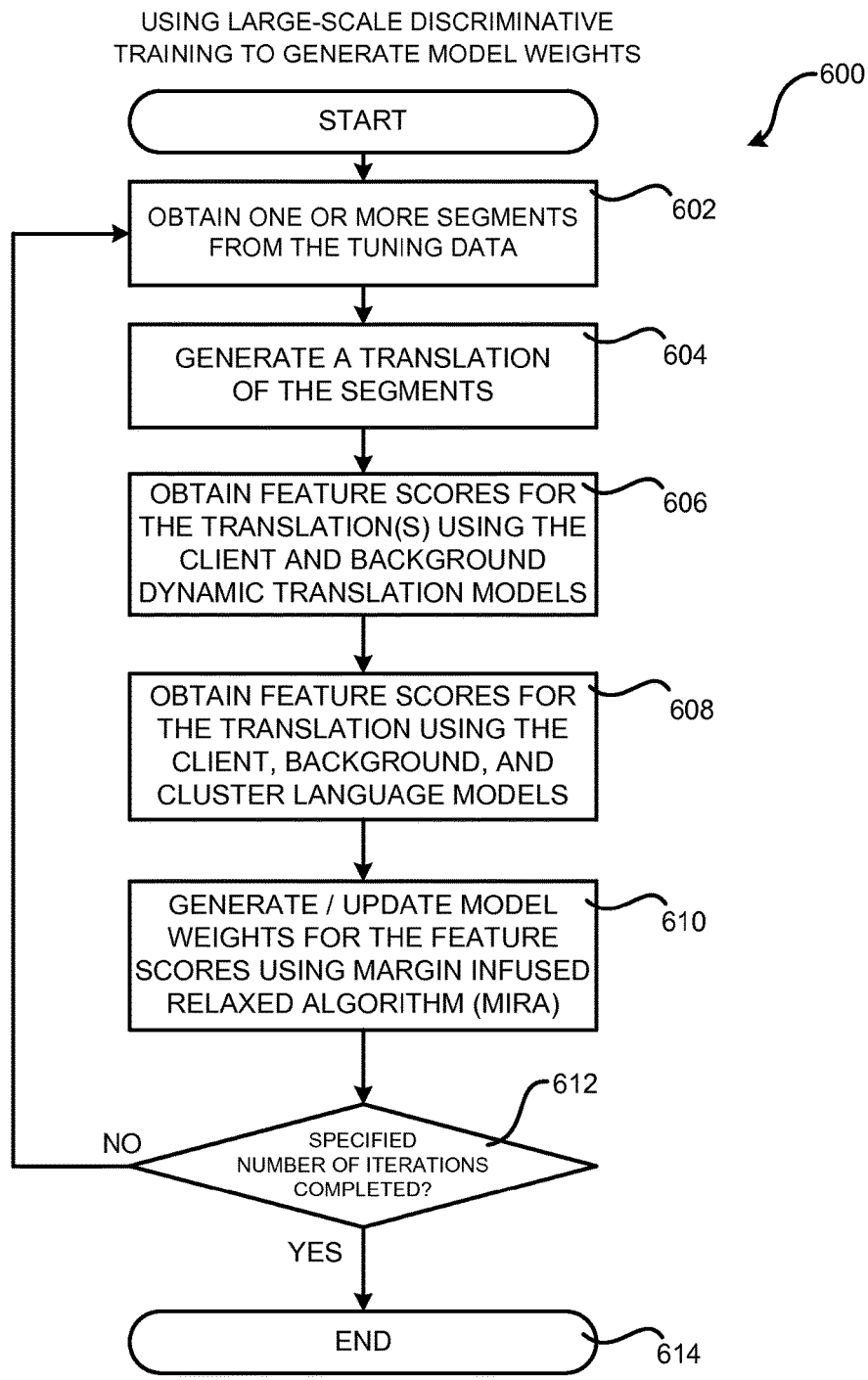
FIG. 6 is a flow diagram showing a routine that illustrates aspects of the operation of the machine learning system shown in FIG. 1 for using large-scale discriminative training to generate model weights, according to one configuration disclosed herein.

FIG. 6 is a flow diagram showing a routine 600 that illustrates aspects of the operation of the workflow 112 shown in detail in FIG. 5 for using large-scale discriminative training to generate model weights 114, according to one configuration disclosed herein. The routine 600 begins at operation 602, where one or more text segments in the source language are obtained from the additional client tuning data 104C-104D. The routine 600 then proceeds from operation 602 to operation 604, where the statistical machine translation system described herein is utilized to generate a translation of the segment, or segments, obtained at operation 602. Additional details regarding the manner in which translation is performed are provided below with regard to FIGS. 7 and 8.

From operation 604, the routine 600 proceeds to operation 606, where feature scores 504 are obtained for the translation from the dynamic background translation model 108A and the dynamic client translation model 108B. Feature scores 504 can also be obtained from other translation models if utilized. For example, although not illustrated in FIG. 5, feature scores 504 can also be obtained for a combined translation model in some configurations.

From operation 606, the routine 600 proceeds to operation 608, where feature scores 504 are obtained from the background language model 110A, the client language model 110B, and the cluster-based language model 110C. Feature scores 504 can also be obtained from other language models if utilized. For example, although not illustrated in FIG. 5, feature scores 504 can also be obtained for a combined language model in some configurations. As discussed above, feature scores 504 can also be obtained from other sources, including statistical measures obtained during translation.

From operation 608, the routine 600 proceeds to operation 610, where the model weights 114 are generated or adjusted utilizing the MIRA algorithm in one specific configuration.

For example, and without limitation, the model weights 114 can be adjusted such that the disclosed statistical machine translation system generates a translated segment 126 for an input segment 124 that is as close as possible to a reference translation.

From operation 610, the routine 600 proceeds to operation 612, where a determination is made as to whether a predetermined number of iterations have been performed. If the specified number of iterations have not been performed, the routine 600 proceeds back to operation 602, where another iteration of the routine 600 can be performed. If, however, the specified number of iterations have been performed, the routine 600 proceeds from operation 612 to operation 614, where it ends.

It should be appreciated that, in one configuration, the statistical machine translation system described above does not have any in-domain client training data 104 available at the time of initial training. In this scenario, the translation package 116 can be generated utilizing only the out-of-domain training data 102. Subsequently, as in-domain client data is received, such as post-edited translations generated by the machine translation system, the system can be rapidly adapted in the manner described below with regard to FIGS. 9A-9B and 10. In this manner, the statistical machine translation system can be implemented without the requirement of any in-domain client training data 104 initially. This can also reduce the time required to initially build the translation package 116.

In another scenario, the in-domain client training data 104 is extracted from the out-of-domain background training data 102. For example, and without limitation, a portion of the non-domain-specific background training data 102 that is relevant to the text to be translated at run time can be extracted from the non-domain-specific background training data 102. The relevant portion of the non-domain-specific background training data 102 can be selected utilizing various statistical methods. For example, and without limitation, various mechanisms can be utilized to select a portion of the out-of-domain data that is most similar to the data to be translated. This can be done in several ways. In particular, out-of-domain sentences that have high n-gram overlap (for example, phrases of two consecutive words) with the monolingual or in-domain data can be utilized as in-domain data. As another example, sentences that have a high likelihood according to a statistical language model trained on the monolingual in-domain data can also be utilized as in-domain data. Other mechanisms may be utilized in other configurations. The selected subset of the non-domain-specific background training data 102 can then be utilized as the initial set of in-domain client training data 104.

Figure 7:
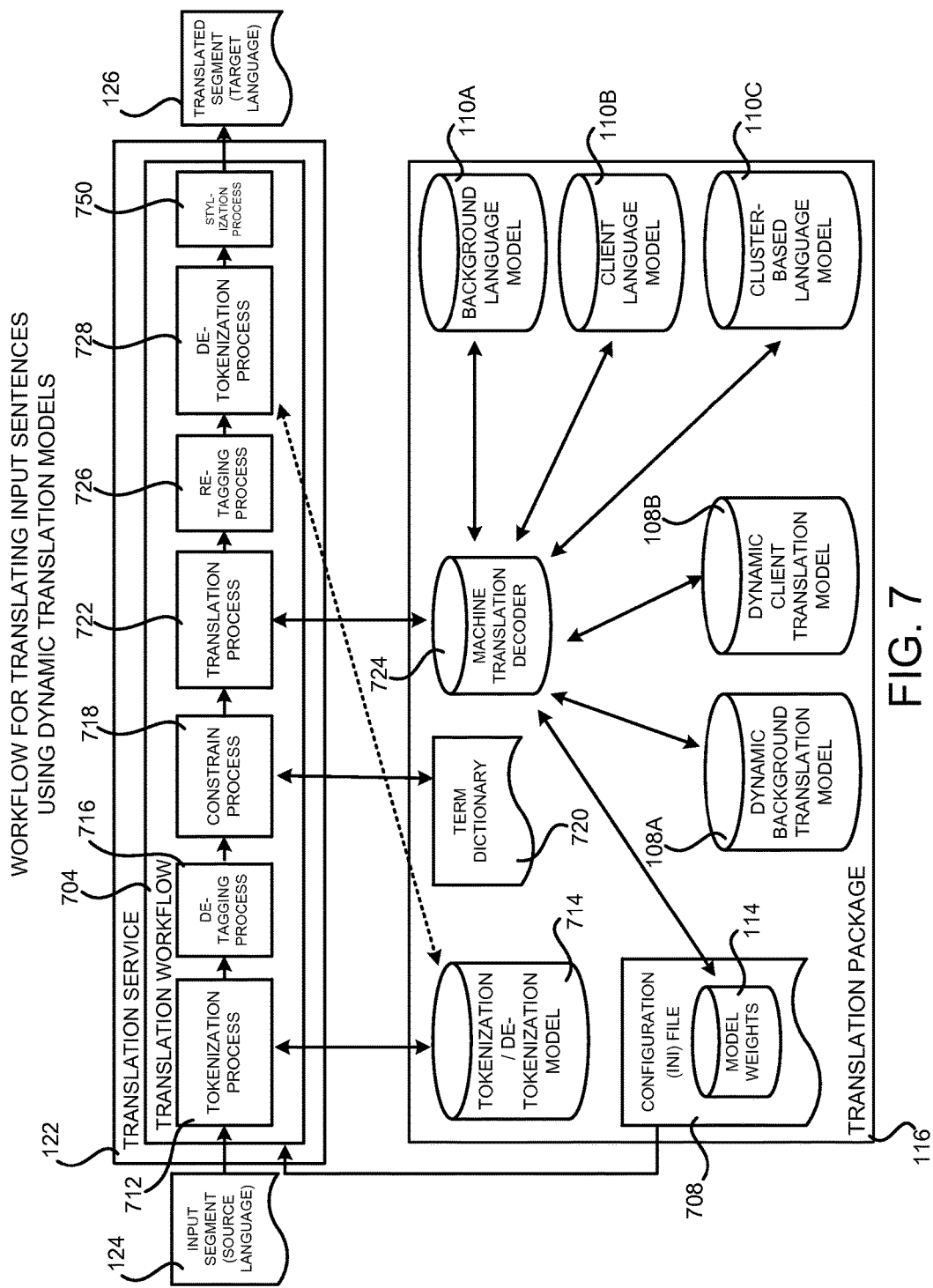
FIG. 7 is a system architecture diagram showing aspects of the operation of the machine learning system shown in FIG. 1 for translating input segments using dynamic translation models and cluster-based language models, according to one configuration disclosed herein.

FIG. 7 is a system architecture diagram showing aspects of the operation of the machine learning system shown in FIG. 1 for translating input segments 124 using the dynamic translation models 108 and cluster-based language models 110C, according to one configuration disclosed herein. As discussed briefly above, the translation package 116 is deployed to the service provider network 120 for use by the translation service 122 in one particular configuration. As illustrated in FIG. 7, the translation package includes the background language model 110A, the client language model 110B, and the cluster-based language model 110C. A combined language model (not shown in FIG. 7) can also be utilized in some configurations.

The translation package 116 also includes the dynamic background translation model 108A and the dynamic client translation model 108B. A combined translation model (not shown in FIG. 7) can also be utilized in some configurations.

The translation package can also include a configuration file 708 that includes the model weights 114. The configuration file 708 might also specify other preferences regarding the manner in which translations are to be performed.

In some configurations, the translation package 116 also includes a tokenization/de-tokenization model 714. The tokenization/de-tokenization model 714 can be generated by the tokenization process 306 described above and utilized at translation time to tokenize and/or de-tokenize an input segment 124 that is to be translated. The translation package 116 can also include a term dictionary 720 that includes translations for client-specific words or phrases. As discussed in greater detail below, the term dictionary 720 can be utilized to ensure that specified words or phrases are translated in the same manner regardless of the context within which they appear.

The translation package 116 also includes a machine translation decoder 724. In one particular configuration, the machine translation decoder 724 is the MOSES open-source statistical machine translation system. Other statistical machine translation decoders can be utilized in other configurations. The configuration file 708 can include data for configuring the machine translation decoder 724 in various ways. Additional details regarding the MOSES open-source statistical machine translation system can be found at http://www.statmt.org/moses/.

As shown in FIG. 7 and described briefly above, the translation service 122 can utilize the translation package 116 when translating an input segment 124 in a source language to a translated segment 126 in a target language. In particular, the translation service 122 is configured in some implementations to implement a translation workflow 704 in order to perform the translation. The configuration file 708 can include data that specifies various aspects regarding the operation of the translation workflow 704.

The translation workflow 704 begins with the tokenization process 712. The tokenization process 712 that is performed at translation time is similar to the tokenization process 306 described above. In particular, the tokenization process 712 tokenizes the input segment 124 by breaking the text into discrete units. For example, and without limitation, the tokenization process 712 can separate punctuation characters, perform normalization on the text, and break apart contractions. As mentioned above, the tokenization/de-tokenization model 714 can be generated by the tokenization process 306 and utilized by the tokenization process 712 and utilized at translation time. The tokenization/de-tokenization model 714 can also be the same as the tokenization process 306.

The tokenization process 712 provides the tokenized input segment 124 to the de-tagging process 704. The de-tagging process 704 removes any markup tags (e.g. HTML tags) that appear in the input segment 124. As will be described in greater detail below, the removed markup tags can be added to the translated segment 126 by the re-tagging process 726. In this manner, formatting contained in the input segment 124 can be preserved in the translated segment 126.

The tokenized and de-tagged input segment 124 is provided to the constrain process 718 in one configuration. The constrain process 718 utilizes the term dictionary 720 to translate specified words or phrases identified in the term dictionary 720. As mentioned above, this enables a specific translation of a word or phrase to be performed regardless of the context in which the word or phrase appears. Other types of constraints can also be utilized in other configurations instead of or in addition to the term dictionary 720.

The next step in the translation workflow 704 is the translation process 722. The translation process 722 utilizes the machine translation decoder 724 to translate the input segment 124 into the target language. In this regard, the machine translation decoder 724 can utilize the dynamic background translation model 108A, the dynamic client translation model 108B, and a combined translation model, if present, to dynamically learn a model that can be utilized to translate the input segment 124 specifically to one or more candidate translations of the input segment 124 in the target language.

As also mentioned above, the translation models 108 can provide various feature scores 504 for the candidate translations. Similarly, the machine translation decoder 724 can utilize the background language model 110A, the client language model 110B, and the cluster-based language model 110C to also generate feature scores 504 for the candidate translations. The model weights 114 can then be utilized to weight the various contributions from the language models 110 and the translation models 108. The weighted feature scores can then be utilized to combine various candidate translations to form a translation of the input segment 124.

As mentioned briefly above, the re-tagging process 726 can then be performed to re-apply any formatting removed from the input segment 124 by the de-tagging process 704. Subsequently, the de-tokenization process 728 can utilize the tokenization/de-tokenization model 714 to de-tokenize the translated segment 126. For example, and without limitation, the de-tokenization process 728 can attach punctuation to the translated segment 126 that was separated by the tokenization process 712. As another example, the de-tokenization process 728 can merge contractions that were broken apart by the tokenization process 712. The de-tokenization process 728 can also perform other functionality not specifically mentioned herein.

In one configuration, a stylization process 750 is also performed as a part of the translation workflow 704. The stylization process 750 utilizes pre-defined lists of client-specific rules to stylize the translated segment 126. For example, and without limitation, spaces can be inserted before measurements or a certain type of quotation marks can be utilized for a specific language. Other types of client-specific stylizations that are to be applied to the translated segment 126 can also be defined and utilized in a similar manner.

Once the translation workflow 704 has completed, the translated segment 126 can be returned in response to the request to translate the input segment 124 from the source language to the target language. Additional details regarding the operation of the translation workflow 704 will be provided below with regard to FIG. 8.

Figure 8:
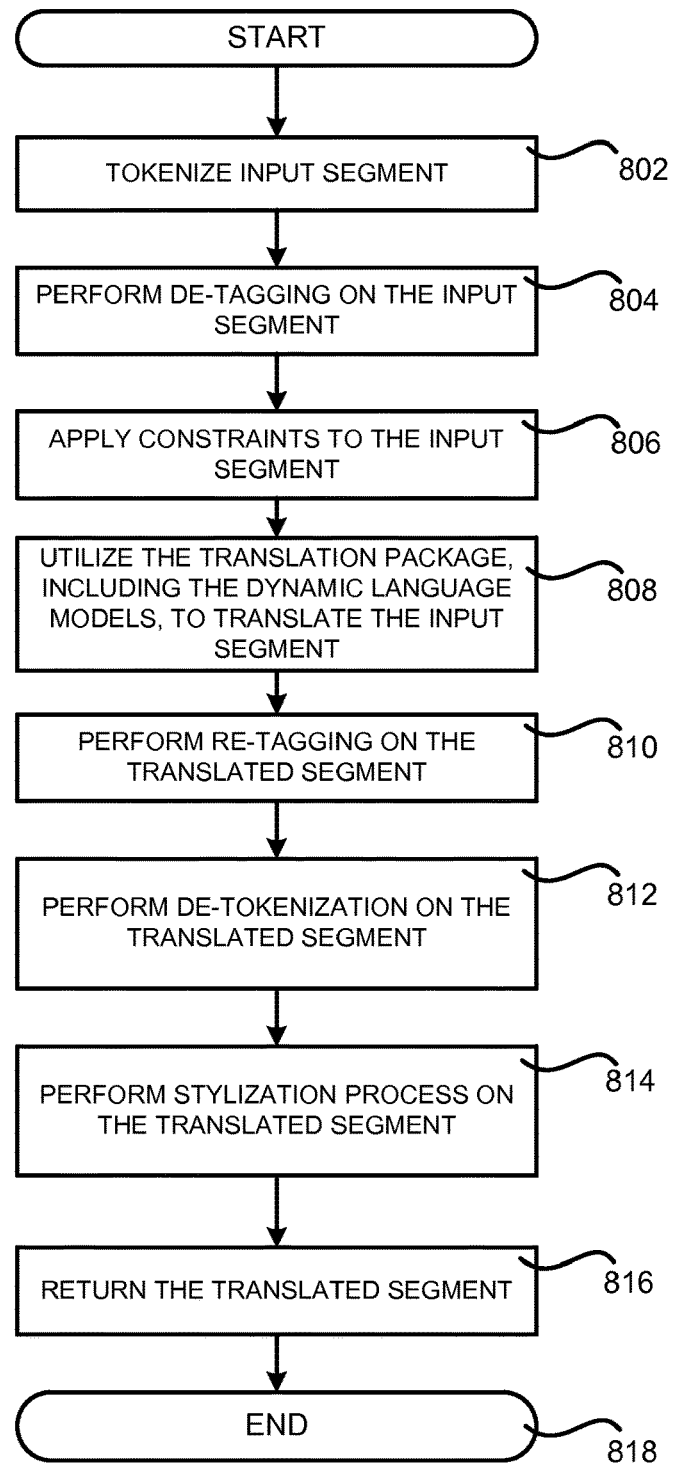
FIG. 8 is a flow diagram showing a routine that illustrates aspects of the operation of the machine learning system shown in FIG. 1 for translating input segments using dynamic translation models and cluster-based language models, according to one configuration disclosed herein.

FIG. 8 is a flow diagram showing a routine 800 that illustrates aspects of the operation of the machine learning system shown in FIG. 1 for translating input segments using dynamic translation models 108 and cluster-based language models 110C, according to one configuration disclosed herein. The routine 800 begins at operation 802, where the tokenization process 712 tokenizes the input segment 124 in the manner described above. Once the input segment 124 has been tokenized, the routine 800 proceeds from operation 802 to operation 804, where the de-tagging process 716 removes any tags or other types of formatting from the tokenized input segment 124. The routine 800 then proceeds from operation 804 to operation 806.

At operation 806, the constrain process 718 utilizes the term dictionary 720 to constrain the tokenized and de-tagged input segment 124. As discussed above, the constrain process 718 can utilize the term dictionary 720 to ensure that specified terms are translated in the same way regardless of the context in which they appear. From operation 806, the routine 800 proceeds to operation 808.

At operation 808, the translation process 722 is performed to identify a likely translation of the input segment 124. As discussed above, the machine translation decoder 724 can utilize the translation models 108 to map the phrases in the input segment 124 to candidate translations. The language models 110, including the cluster-based language model 110C, can then generate feature scores for the candidate translations. The model weights 114 are then applied to the feature scores generated by the translation models 108 and the language models 110. A combination of candidate translations for phrases in the input segment 124 having the highest combined feature score can then be selected as the translated segment 126.

From operation 808, the routine 800 proceeds to operation 810, where the re-tagging process 726 adds any tags or other types of formatting to the translated segment 126 that were removed from the input segment 124 by the de-tagging process 704. The routine 800 then proceeds from operation 810 to operation 812.

At operation 812, the de-tokenization process 728 is performed in order to negate the tokenization performed by the tokenization process 712. As discussed above, for example, contractions that were split apart by the tokenization process 712 may be rejoined. Other types of de-tokenization can also be performed. The routine 800 then proceeds from operation 812 to operation 814, where the stylization process 750 can apply client-specific stylistic elements to the translated segment 126. The routine 800 then proceeds from operation 814 to operation 816, where the translated segment 126 can be returned in response to a request to translate the input segment 124. For example, and without limitation, the translation service 122 can return a Web services reply that includes the translated segment 126. The routine 800 then proceeds from operation 816 to operation 818, where it ends.

Figure 9A:
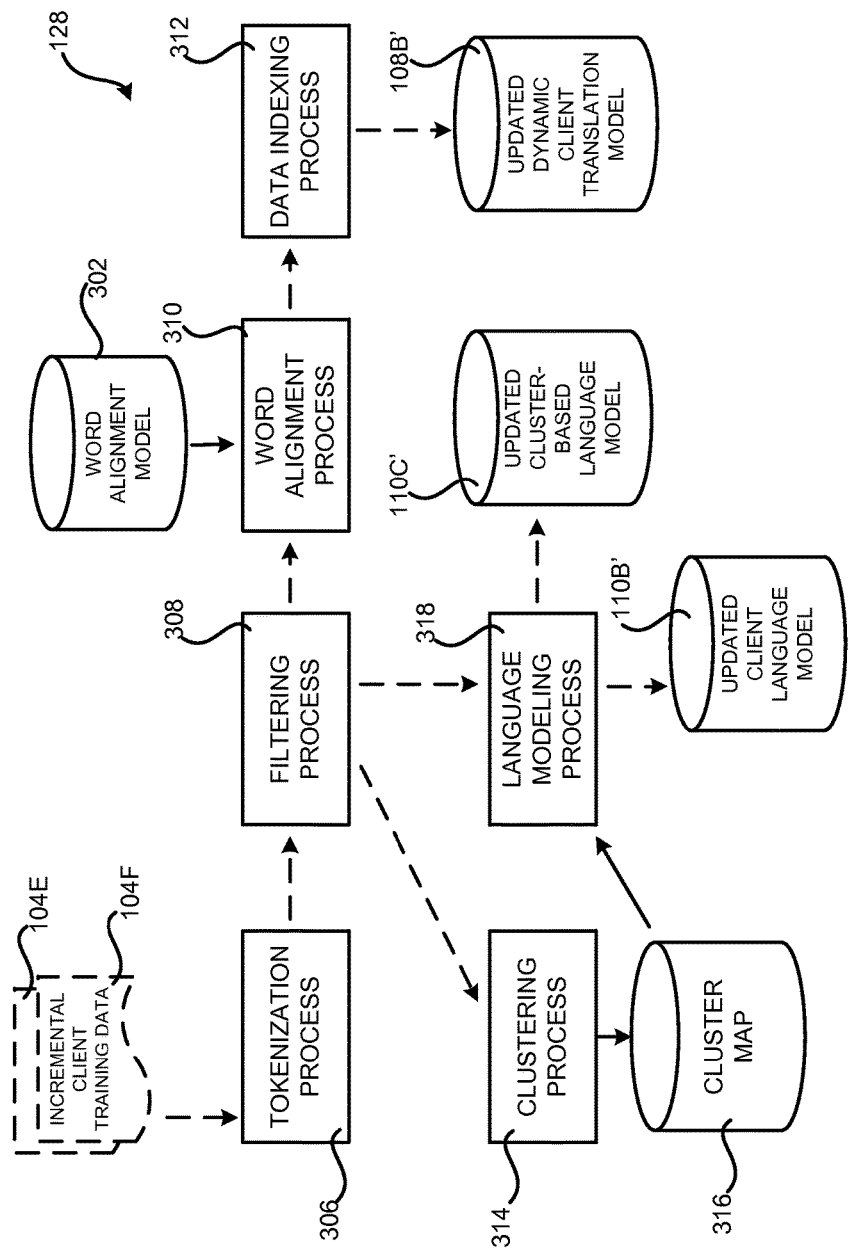
FIG. 9A is a system architecture diagram showing aspects of the operation of the machine learning system shown in FIG. 1 for rapid adaptation of dynamic translation models and language models, according to one configuration disclosed herein.

FIG. 9A is a system architecture diagram showing aspects of the operation of the workflow 128 shown in FIG. 1 for rapid adaptation of the dynamic translation models 108 and the language models 110, according to one configuration disclosed herein. As discussed briefly above, the workflow 128 provides functionality for rapid adaptation of the dynamic translation models 108, the language models 110, and the model weights 114. In order to perform rapid adaption of these components, the workflow 128 takes as input incremental in-domain client training data 104E-104F. For example, translations generated by the statistical machine translation system shown in FIG. 1 might be post-edited by human translators to ensure that they are accurate translations of the associated input segment. As discussed above, an appropriate computer-generated user interface can be provided through which human post-editors can supply post-edited translations. The input segments and their corresponding post-edited translations can then be utilized as the incremental client training data 104E-104F for use in rapidly adapting the dynamic translation models 108, the language models 110, and the model weights 114.

The in-domain incremental client training data 104E-104F is first tokenized by the tokenization process 306 described above. The filtering process 308, which was also described above, can then be applied to the incremental client training data 104E-104F. The word alignment process 310 can then utilize the previously learned word alignment model 302 to word align text in the incremental client training data 104E-104F. By using the previously generated word alignment model 302, word alignment of the incremental client training data 104E-104F can be performed more quickly than if word alignment were performed from scratch.

Once the incremental client training data 104E-104F has been tokenized, filtered, and word-aligned, the data indexing process 312 creates an updated dynamic client translation model 108B' by indexing the incremental client training data 104E-104F. For example, and without limitation, in configurations where the dynamic client translation model 108B is implemented using a suffix array data structure, the incremental client training data 104E-104F can be added to the suffix array data structure in order to create the updated dynamic client translation model 108B'.

As shown in FIG. 9A, the tokenized and filtered incremental client training data 104F in the target language can also be provided to the clustering process 314 and the language modeling process 318. The clustering process 314 can utilize the incremental client training data 104F in the target language to update the cluster map 316. Once the cluster map 316 has been updated, the language modeling process 318 can utilize the updated cluster map 316 to update the cluster-based language model 110C and create an updated cluster-based language model 110C'. Similarly, the language modeling process 318 can utilize the incremental client training data 104F in the target language to create an updated client language model 110B'.

In one particular configuration, an out-of-band process can be performed for identifying newly formed Brown clusters that are not well defined. This process can also work proactively to obtain data to build out the newly formed Brown clusters. For example, and without limitation, sentence variants can be recommended based on existing training data, or a search may be made for variants across a cross-domain training repository. In this manner, the cluster map 316 can be independently improved out-of-band without relying on the availability of new training data (i.e. the incremental client training data 104E-104F).

As will be described in greater detail below, the workflow 128 illustrated in FIGS. 9A and 9B can also generate an updated translation package containing the updated client language model 110B', the updated cluster-based language model 110C', the updated dynamic client translation model 108B', and updated model weights. The updated translation package can then be deployed to the service provider network 120 in place of the previous version of the translation package 116. Additional details regarding this process will be provided below.

Figure 9B:
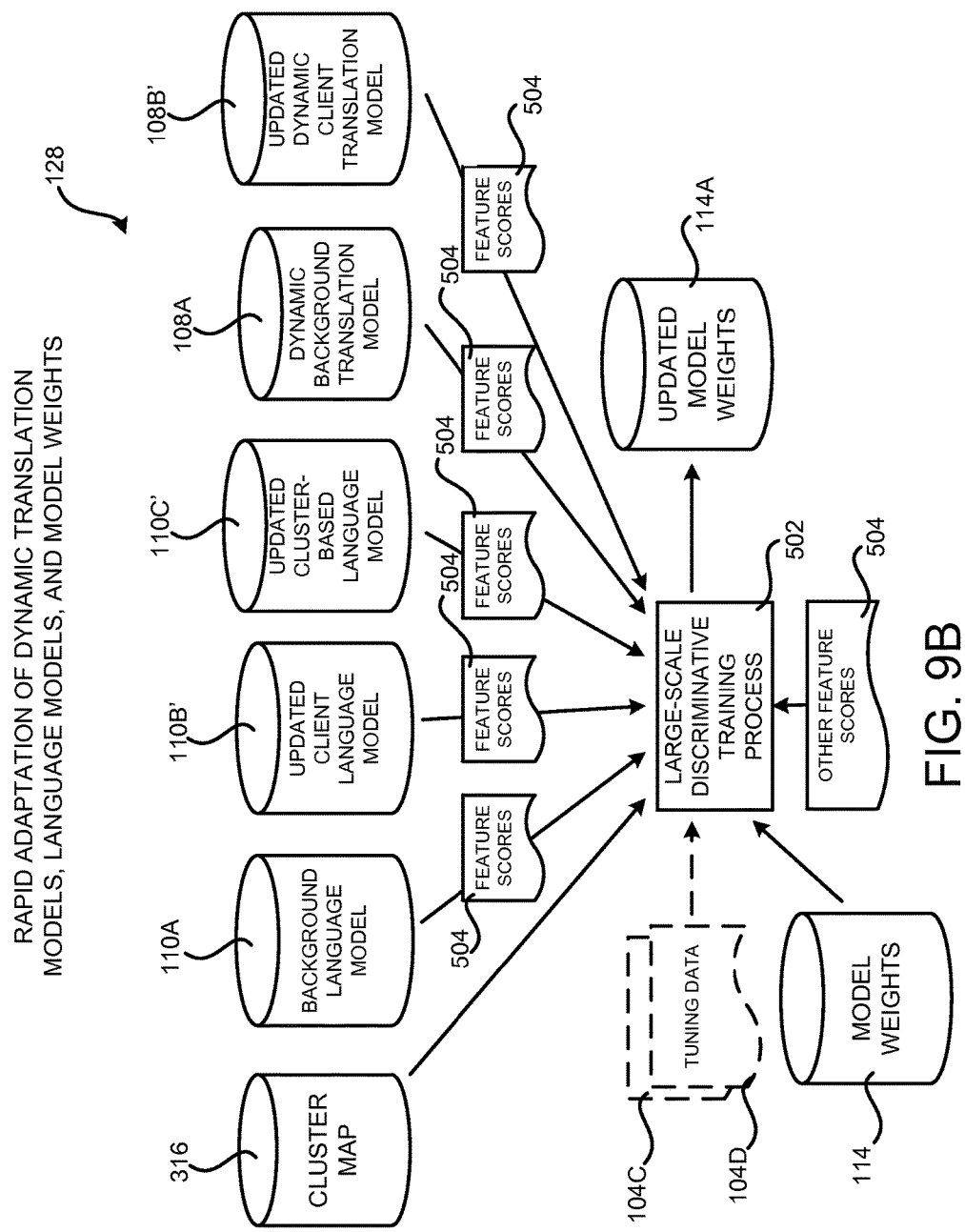
FIG. 9B is a system architecture diagram showing additional aspects of the operation of the machine learning system shown in FIG. 1 for rapid adaptation of model weights, according to one configuration disclosed herein.

FIG. 9B is a system architecture diagram showing additional aspects of the operation of the workflow 128 shown in FIG. 1 for rapid adaptation of the model weights 114, according to one configuration disclosed herein. As discussed above, the large-scale discriminative training process 502 can also be utilized to generate updated model weights 114A for the updated dynamic client data translation model 108B', the updated cluster-based language model 110C', and the updated client language model 110B'. For example, and without limitation, the MIRA algorithm discussed above can utilize the additional client tuning data 104C-104D (which may or may not be the same tuning data used to generate the initial model weights 114) and the previously generated model weights 114 to generate updated model weights 114A utilizing fewer iterations than required to generate the initial model weights 114.

As mentioned above, an updated translation package (not shown in FIG. 9B) can then be created that includes the updated dynamic client data translation model 108B', the updated cluster-based language model 110C', the updated client language model 110B', and the updated model weights 114A. The updated translation package can then be deployed to the service provider network 120 in place of the previous version of the translation package 116.

As also mentioned briefly above, comparative testing is performed in some configurations between the earlier version of the translation package 116 and the updated translation package. The updated translation package can then be deployed, such as within the service provider network 120, in place of the previously deployed translation package 116 based upon the results of the testing. For example, and without limitation, the updated translation package is deployed in one configuration if the quality of the translations it generates are as good as or better than translations generated by the previously deployed translation package 116.

Figure 10:
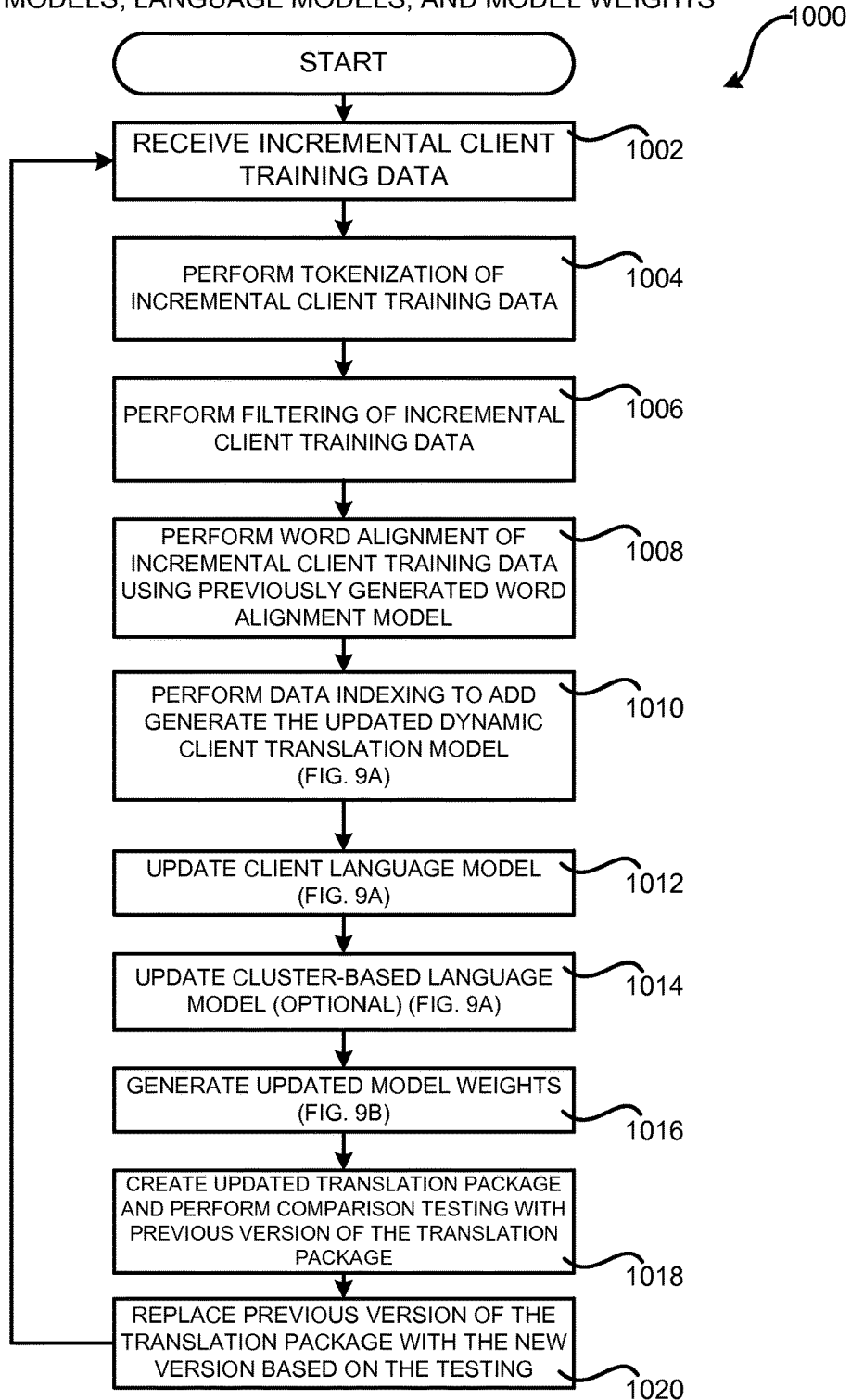
FIG. 10 is a flow diagram showing a routine that illustrates aspects of the operation of the machine learning system shown in FIG. 1 for rapid adaptation of dynamic translation models, language models, and model weights, according to one configuration disclosed herein.

FIG. 10 is a flow diagram showing a routine 1000 that illustrates aspects of the operation of the workflow 128 shown in detail in FIGS. 9A and 9B for rapid adaptation of the dynamic translation models 108, the language models 110, and the model weights 114, according to one configuration disclosed herein. The routine 1000 begins at operation 1002, where the incremental in-domain client training data 104E-104F is received. The routine 1000 then proceeds from operation 1002 to operation 1004.

At operation 1004, the tokenization process 306 tokenizes the incremental client training data 104E-104F in the manner described above. Once the incremental client training data 104E-104F has been tokenized, the routine 1000 proceeds from operation 1004 to operation 1006, where the filtering process 308 filters the tokenized incremental client training data 104E-104F in the manner described above. The routine 1000 then proceeds from operation 1006 to operation 1008.

At operation 1008, the word alignment process 310 performs word alignment of the incremental client training data 104E-104F using the previously generated word alignment model 302. The routine 1000 then proceeds from operation 1008 to operation 1010, where the tokenized, filtered, word-aligned incremental client training data 104E-104F is indexed to generate the updated dynamic client translation model 108B'. The routine 1000 then proceeds from operation 1010 to operation 1012.

At operation 1012, the language modeling process 318 utilizes the incremental client training data 104F in the target language to update the client language model 110B and create the updated client language model 110B'. The routine 1000 then proceeds from operation 1012 to operation 1014, where the cluster-based language model 110C may be updated to create the updated cluster-based language model 110C'. The routine 1000 then proceeds to operation 1016, where updated model weights 114A are generated in the manner described above with regard to FIG. 9B. The routine 1000 then proceeds from operation 1016 to operation 1018.

At operation 1018, an updated translation package is created that includes the updated dynamic client translation model 108B', the updated cluster-based language model 110C' (if generated), the updated client language model 110B', and the updated model weights 114A. As discussed above, comparative testing can also be performed between the translation package 116 and the updated translation package. For example, the quality of translated phrases generated by the translation package 116 and the updated translation package can be compared to determine if translations generated by the updated translation package are as good as or better than translations generated by the previous version of the translation package 116. Other mechanisms can also be utilized to perform comparative testing on the translation package 116 and the updated translation package.

The updated translation package can then be deployed, such as to the service provider network 120, in place of the previous version of the translation package 116 based upon the results of the comparative testing at operation 1020. For example, and without limitation, the updated translation package can be deployed if translations generated by the updated translation package are as good as or better than translations generated by the previous version of the translation package 116. Deployment of the updated translation package can be performed in an automated manner without human intervention. The routine 1000 then returns to operation 1002, where the process described above for rapid adaptation of the translation models, language models, and model weights can be performed periodically.

It should be appreciate that the rapid adaptation mechanism shown in FIGS. 9A-9B and 10, and described above, has been shown to increase relative translation quality. For example, and without limitation, improvements of up to 10% in relative translation quality have been observed as a result of rapid adaptation with incremental data in the manner described above. Other technical benefits might also be realized through an implementation of this technology.

Figure 11:
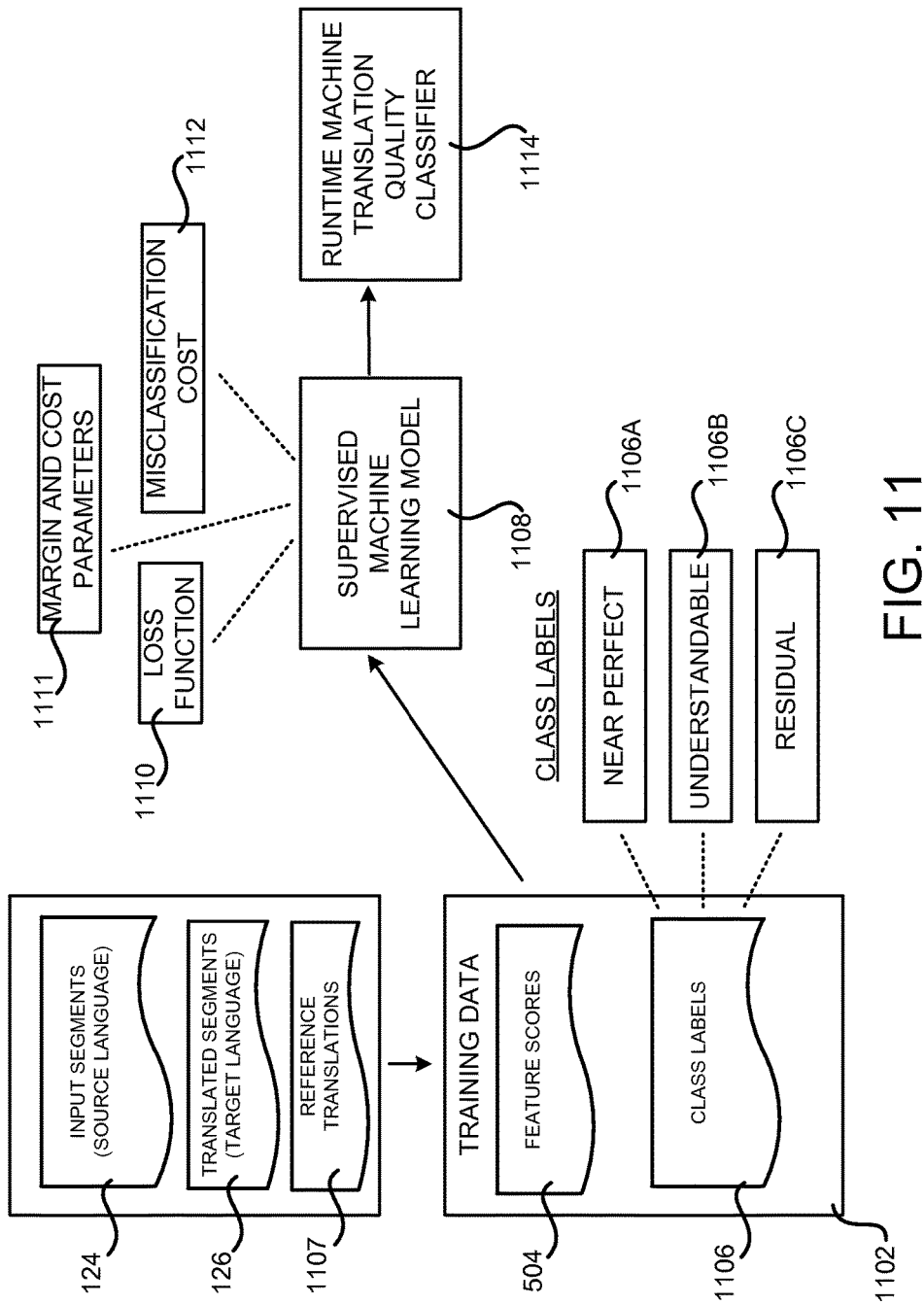
FIG. 11 is a system architecture diagram showing aspects of the operation of the machine learning system shown in FIG. 1 for training a runtime machine translation quality classifier that is capable of estimating the quality of machine translations without utilizing reference translations.

FIG. 11 is a system architecture diagram showing aspects of the operation of the machine learning system shown in FIG. 1 for training a runtime machine translation quality classifier 1114 that is capable of estimating the quality of machine translated text segments without utilizing reference translations. In particular, and as will be discussed in greater detail below, the runtime machine translation quality classifier 1114 is a machine learning classifier capable of assigning class labels 1106 to translated segments 126 generated by the machine learning system described above that reflect the predicted translation quality of the translated segments 126. The class labels 1106 can be assigned without the benefit of reference translations for the translated segments 126.

In one particular implementation, the runtime machine translation quality classifier 1114 can classify translated segments 126 as being in one of three classes. In particular, a class label 1106A can be assigned to a translated segment 126 if the translated segment is perfect or near perfect. A "perfect or near perfect" translation is one that is fully usable and understandable in raw form or one that requires minimal editing in order to be consumable by a human reader.

A class label 1106B can also be assigned to a translated segment 126 that is understandable but that is not a perfect or near perfect translation. An "understandable" translated segment 126 is a translated text segment for which it would be more productive for a human translator to edit the translation to arrive at a perfect or near perfect translation than it would be for the human translator to translate the corresponding input segment 124 from scratch. Translated segments that have been assigned an "understandable" class label 1106B have a lower quality than translated segments 126 that have been assigned a "perfect or near perfect" class label 1106A.

A class label 1106C can also be assigned to a translated segment 126 that is considered to be a "residual" translation. A residual translation is one that is not fundamentally usable in its raw form and for which it would not be productive for a human editor to edit the translated segment 126 to arrive at a perfect or near perfect translation. Translated segments that have been assigned a "residual" class label 1106C are of a lower quality than translations that have been assigned an "understandable" class label 1106B or a "perfect or near perfect" class label 1106A. In this regard, it should be appreciated that the class labels 1106 described herein are merely illustrative and that other class labels 1106 and numbers of class labels 1106 can be utilized. The number of classes and their significance can be user-definable in the machine translation system described herein.

A supervised machine learning model 1108 is utilized to train the runtime machine translation quality classifier 1114. In one particular configuration, for example, the supervised machine learning model 1108 is a Support Vector Machine ("SVM"). In particular, the supervised machine learning model 1108 can be implemented utilizing a modified version of the open-source SVM software package available from LIBSVM. As will be described in greater detail below, multi-class classification can be performed utilizing a radial basis kernel, which allows learning a rich, non-linear mapping of features. The particular modifications made to the open-source SVM software package are described in further detail below.

As shown in FIG. 11, the supervised machine learning model 1108 utilizes training data 1102 to train the runtime machine translation quality classifier 1114. As also shown in FIG. 11, the training data 1102 includes feature scores 504 associated with input segments 124 in the source language and the corresponding translated segments 126 in the target language. The translated segments 126 are generated in the manner described above with regard to FIGS. 1-10. As discussed above, the feature scores 504 are statistical features that can be extracted from the source-language text (i.e. the input segments 124) and the corresponding translated segment 126. The feature scores 504 can also include other statistical features that are computed as an aspect of the operation of the statistical machine translation system described above. The training data 1102 can also include the reference translations 1107, the source segments 124, and the machine translated output 126.

In one particular implementation, the feature scores 504 are selected in an empirical manner that leads to improved quality in the classification of translated segments 126. In particular, the feature scores 504 in the training data 1102 can include feature scores 504 that describe the fluency of the translated segments 126. For example, feature scores 504 can be generated by scoring the translated segments 126 against a target language model (e.g. the background language model 110A, the client language model 110B, and/or a combined language model). Additionally, feature scores 504 can be generated that provide a statistical indication of how well the language models score phrases of words (e.g. N-grams) in the machine translated segments 126. By examining sequences of words in the translated segments 126 and generating statistical scores using the language models, feature scores 504 can be generated that indicate the fluency of the translated segments 126.

The training data 1102 can also include feature scores 504 that describe a level of ambiguity experienced by the machine translation system described above in translating the input segments 124. In particular, in one configuration the translation models 108 and the word alignment model 302 described above can be utilized to provide an indication for each word or phrase in the input segment 124 as to the ambiguity experienced by the machine translation system when translating the word or phrase. For instance, the number of candidate translations available to the machine translation system for individual words and phrases in the input segments 124 can be utilized as a measure of the encountered ambiguity. Other measures of ambiguity can also be utilized.

The training data 1102 can also include feature scores 504 that describe the estimated difficulty of the machine translation system described above in translating the input segments 124. For example, data describing the number of out-of-vocabulary ("OOV") words in the input segments 124 can be utilized as an indication of the estimated difficulty of the machine translation system in translating the input segments 124. Other indicators of the difficulty encountered when translating the input segments 124 can also be utilized.

The training data 1102 can also include feature scores 504 that describe the difference in length and/or punctuation between an input text segment 124 and the corresponding machine translated segment 126. The training data 1102 can also include other feature scores 504, including statistical confidence measures generated by the machine translation system described above for the machine translated text segments 126. Other combinations of feature scores 504 and other feature scores 504 not particularly mentioned herein can also be utilized. As will be described in greater detail below, the same combination of feature scores 504 contained in the training data 1102 are also utilized at translation time to assign a class label 1106 to a translated segment 126. Additional details regarding this process will be provided below with regard to FIG. 12.

As shown in FIG. 11, the training data 1102 also includes the correct class labels 1106 for the translated segments 126 in the training data 1102. The correct class labels 1106 are computed in one particular implementation based upon an edit-distance measure that quantifies the amount of editing required to transform the output generated by the machine translation system (i.e. the translated segments 126) into a fully correct translation. For example, the Translation Edit Rate ("TER") can be utilized to compute the edit distance between the translated segments 126 and corresponding reference translations 1107. In this configuration, the class labels 1106 are defined as quantized bins of TER scores.

The particular TER score assigned to each of the class labels 1106 can be defined based upon the particular requirements of the statistical machine translation system. For example, and without limitation, a translated segment 126 with a TER score of less than ten can be classified as a "perfect or near perfect" translation, a translated segment 126 with a TER score between ten and 50 can be classified as an "understandable" translation, and a translated segment 126 with a TER score greater than 50 can be considered a "residual" translation. Other thresholds and numbers of bins of TER scores can be utilized in other configurations.

As described briefly above, the training data 1102 can be skewed in terms of the number of training instances (i.e. input segments 124 and corresponding translated segments 126) in each of the classes 1106. For example, the natural distribution of the training data 1102 can result in more training data being in one class 1106 than in others. In order to address this issue, and potentially others, the supervised machine learning model 1108 utilized to train the runtime machine translation quality classifier 1114 can be configured to prevent bias from developing toward any class label 1106 that dominates the training data 1102.

In particular, in a configuration that utilizes an SVM as the supervised machine learning model 1108, a misclassification cost 1112 in the optimization objective of the SVM can be modified to offset any imbalance between the classes 106 contained in the training data 1102 utilized to train the runtime machine translation quality classifier 1114. This modification will prevent the runtime machine translation quality classifier 1114 from developing a bias toward any class label 1106 that dominates the training data 1102.

As also described briefly above, the cost associated with the misclassification of a lower-quality translated segment 126 as a higher-quality segment can be considered to be higher than the cost of misclassifying a higher-quality translated segment 126 as a lower-quality segment. For example, and without limitation, it can be considered worse to classify a "residual" segment as a "perfect or near perfect" segment than it is to classify a "perfect or near perfect" segment as an "understandable" segment or even a "residual segment."

In order to address this consideration, and potentially others, the supervised machine learning model 1108 can be configured to utilize varying costs for making different types of errors in classification. For example, in one particular configuration, the training of the runtime machine translation quality classifier 1114 can be biased such that classification errors that classify "perfect or near perfect" or "understandable" segments as "residual" are penalized less than classification errors in the other direction. When an SVM is utilized as the supervised machine learning model 1108, this can be accomplished by modifying the loss function 1110 and the margin and cost parameters 1111 of the multi-class SVM objective appropriately.

Figure 12:
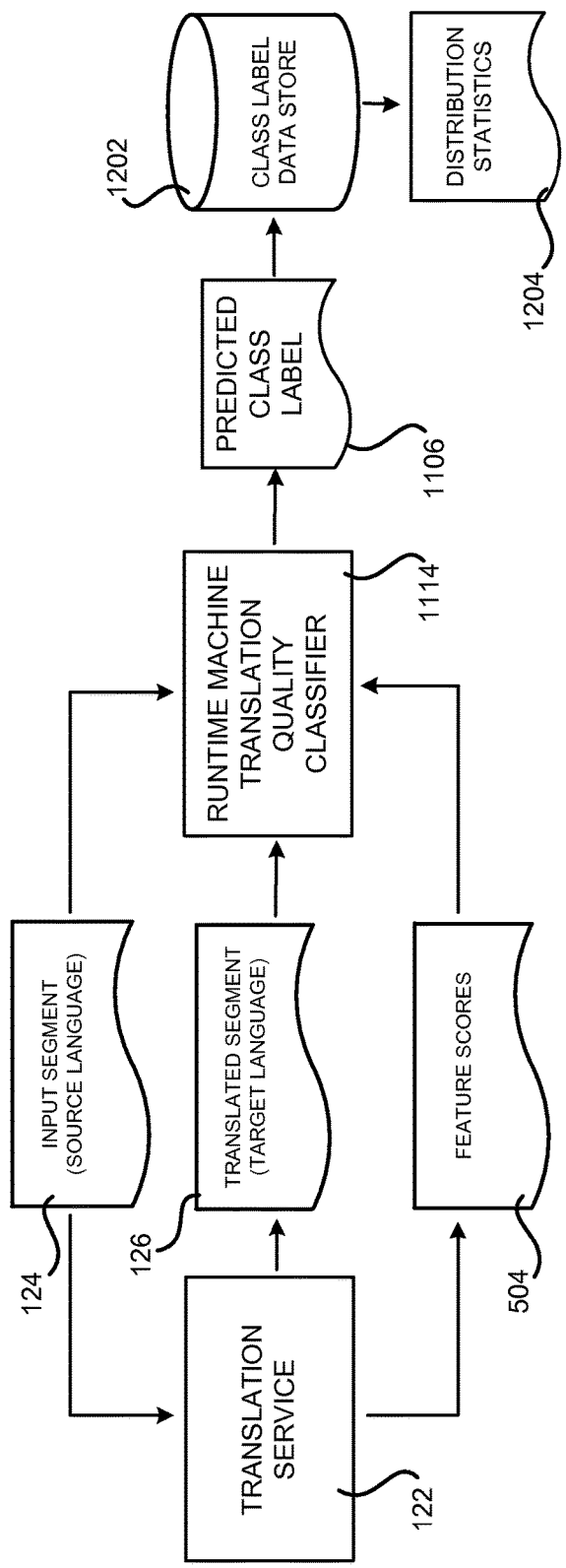
FIG. 12 is a system architecture diagram showing aspects of the operation of the machine learning system shown in FIG. 1 for performing run time quality classification of machine-generated translations without reference translations.

FIG. 12 is a system architecture diagram showing aspects of the operation of the runtime machine translation quality classifier 1114 for performing runtime quality classification of machine-generated translations without reference translations. In particular, once the runtime machine translation quality classifier 1114 has been trained, the classifier 1114 becomes a dedicated run time quality estimator model for the specific machine translation system for which it was trained. The runtime machine translation quality classifier 1114 can be deployed to the service provider network 120 within the translation package 116 or another suitable execution environment.

As shown in FIG. 12, the runtime machine translation quality classifier 1114 can receive an input segment 124 in the source language, a corresponding translated segment 126 in the target language, and the feature scores 504 described above with regard to FIG. 11 from the translation service 122. In response thereto, the runtime machine translation quality classifier 1114 generates the predicted class label 1106 to which the translated segment 126 belongs, in real or near-real time. The predicted class labels 1106 for translated segments 126 received from the translation service 122 can then be aggregated and archived in an appropriate data store, such as the class label data store 1202 shown in FIG. 12. The aggregated classifications can then be utilized to generate distribution statistics 1204, such as document-level or corpus-level distribution statistics. Other types of statistical measures can also be computed over the aggregated predicted class labels 1106 stored in the class label data store 1202.

The predicted class 1106 for a particular translated segment 126 can also be utilized to take various types of actions with regard to the translated segment 126. For example, and without limitation, a translated segment 126 that has been classified as a "perfect or near perfect" translation can be provided to end users, such as in an e-commerce environment. Translated segments 126 in the "understandable" class can be provided to a human editor for post-editing. For example, and without limitation, a service can be configured to provide an appropriate user interface ("UI") for presenting the translated segment 126 and for receiving a post-edited version of the translated segment 126 from a human editor. Other mechanisms can also be utilized for post-editing. The post-edited versions of the translated segments 126 can also be provided back to the machine translation system described above for use as training data.

Translations in the "residual" class are discarded in some configurations. The corresponding input segments 124 for translations classified into the residual class can also be provided to human editors for translation by way of an appropriate computer-generated UI. These translations can also be utilized as additional training data. As discussed above, computer systems can be configured to provide an appropriate UI for presenting input segments 124 to human translators and for receiving the human-generated translations of the input segments 124. Other mechanisms can also be utilized.

In some configurations, translated segments 126 that have been classified in the "residual" class can also be transmitted to a dedicated cluster of instances of the statistical machine translation system described above. This cluster of instances may include configurations of the statistical machine translation described above that are capable of performing additional statistical processing (e.g. retranslating the input segments utilizing more long-running or resource-intensive algorithms, larger translation models, and/or a larger search space) in an attempt to generate higher quality translated segments 126. In particular, these instances can work on examining at broader segments of text that are compute intensive and statistically complex, thus creating a multi-tiered approach that only provides segments to human post-editors (via an appropriate computer-generated UI) once the compute cost approaches or exceeds a predefined fraction of the cost of a human post-editor. In some configurations, the cost of translating input segments utilizing the cluster of instances to retranslate an input segment and the cost of translating an input segment utilizing a human post-editor can be obtained through an API call to a data store containing cost information. An API or another type of call can also be made to one or more external systems to obtain the cost information in other configurations.

It should be appreciated that the mechanism described above with regard to FIGS. 11 and 12 can provide significant improvements over previous classification mechanisms. For example, and without limitation, the system described above has been shown to exhibit full three-class classification accuracy when utilized with typical enterprise client systems in the 60-70% range, or even higher. The bias toward generating more pessimistic predictions described above has also been observed in production systems. Other technical benefits other than those described above can also be realized through an implementation of the disclosed technologies.

It should also be appreciated that the runtime machine translation quality classifier 114 can be periodically retrained. For example, and without limitation, the runtime machine translation quality classifier 1114 can be incrementally or completely retrained following or as a component of the rapid adaptation process described above. The runtime machine translation quality classifier 1114 can also be retrained in response to other types of stimuli in other configurations.

Figure 13:
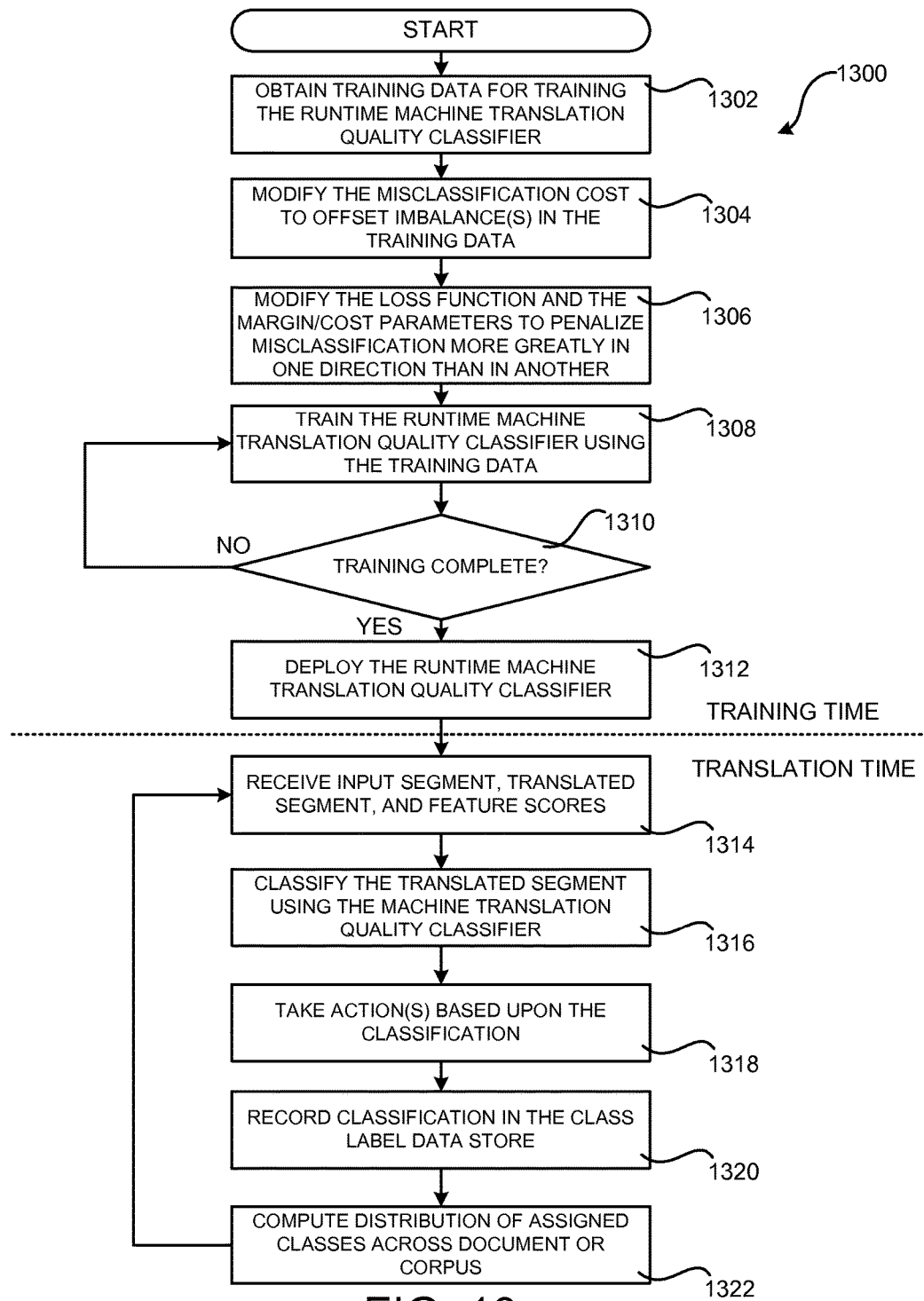
FIG. 13 is a flow diagram showing a routine that illustrates aspects of the operation of the machine learning system shown in FIGS. 11 and 12 for training and utilizing the runtime machine translation quality classifier that is capable of estimating the quality of machine translations without utilizing reference translations.

FIG. 13 is a flow diagram showing a routine 1300 that illustrates aspects of the operation of the mechanism illustrated in FIGS. 11 and 12 for training and utilizing the runtime machine translation quality classifier 1114, respectively. The routine 1300 begins at operation 1302, where the training data 1102 is obtained for training the runtime machine translation quality classifier 1114. As discussed above with regard to FIG. 11, the training data 1102 can include input segments 124 in the source language, corresponding translated segments 126 in the target language, associated feature scores 504, and correct class labels 1106 for the translated segments 126.

From operation 1302, the routine 1300 proceeds to operation 1304, where the misclassification cost 1112 is be modified to offset imbalances in the training data. Additionally, the loss function 1110 and the margin and cost parameters 1111 utilized by the supervised machine learning model 1108 can be modified in order to penalize misclassification more greatly in one direction than in another in the manner described above with regard to FIG. 11. This occurs at operation 1306. The routine 1300 then proceeds to operation 1308, where the supervised machine learning model 1108 is utilized to train the runtime machine translation quality classifier 1114 utilizing the training data 1102.

From operation 1308, the routine 1300 proceeds to operation 1310, where a determination is made as to whether training of the runtime machine translation quality classifier 1114 is complete. If training is not complete, the routine 1300 proceeds back to operation 1304, where training can continue in the manner described above. Once training has completed, the routine 1300 proceeds from operation 1310 to operation 1312, where the runtime machine translation quality classifier 1114 can be deployed in the service provider network 120 within or in conjunction with the translation package 116.

From operation 1312, the routine 1300 proceeds to operation 1314 where the runtime machine translation quality classifier 1114 receives an input segment 124, a translated segment 126, and the associated feature scores 504 from the translation service 122 as shown in FIG. 12. The routine 1300 then proceeds from operation 1314 to operation 1316, where the runtime machine translation quality classifier 1114 classifies the translated segment 126 into one of the three classifications described in order to computed the predicted class label 1106.

From operation 1316, the routine 1300 proceeds to operation 1318, where various types of actions can be performed on the translated segment 126 based upon the predicted class label 1106 for the segment. For example, and as discussed above, the translated segment 126 can be provided to end users, provided to human post-editors, or discarded depending upon the predicted class label 1106. Other types of actions can also be performed in other configurations. For example, and without limitation, the predicted class label 1104 for translated segments 126 can be utilized to set a price paid for human post-editing of the translated segments 126. For example, and without limitation, a price paid for post-editing of translations in the "perfect or near perfect class" may be lower than the price paid for post-editing of translations in the "understandable" or "residual" classes.

From operation 1318, the routine 1300 proceeds to operation 1320, where the predicted class label 1106 for the translated segment 126 can be recorded in an appropriate data store, such as the class label data store 1202. The routine 1300 then proceeds from operation 1320 to operation 1322, where various types of distribution statistics can be computed based upon the aggregated predicted class labels 1104 stored in the class label data store 1202. For example, and without limitation, document-level or corpus-level distribution statistics can be computed. Other types of statistical measures can also be computed in other configurations.

In some configurations, various types of actions can be initiated based upon the statistics computed at operation 1322. For example, and without limitation, histograms can be generated for the segments in each class. Various actions can then be taken based upon the histogram. For instance, an alert could be generated indicating that the machine translation system disclosed herein needs to be retrained when more than 50% (or any other number) of the translated segments are classified into the residual class. Other types of actions can also be taken based upon the computed document-level or corpus-level distribution statistics. From operation 1322, the routine 1300 proceeds back to operation 1314, where class labels 1106 can be predicted for other translated segments 126 in a similar manner.

It should be appreciated that, according to some configurations, the runtime machine translation quality classifier 1114 described above can be utilized to identify poor (i.e. residual) translations at translation time. The input segments 124 corresponding to these translations can then be retranslated utilizing more long-running or resource-intensive algorithms, larger translation models, and/or a larger search space in an attempt to generate a higher-quality translation. It should also be appreciated that the runtime machine translation quality classifier 1114 described herein might also take as input data indicating whether portions of an input segment 124 have been translated deterministically (e.g. translated using the term dictionary described above). The runtime machine translation quality classifier 1114 can utilize this data as an indicator of the quality of at least a portion of a translated segment. Additionally, the runtime machine translation quality classifier 1114 described herein can be extended beyond individual text segments. In particular, the runtime machine translation quality classifier 1114 disclosed herein can generate scores for larger bodies of text, such as an entire page or document.

Figure 14:
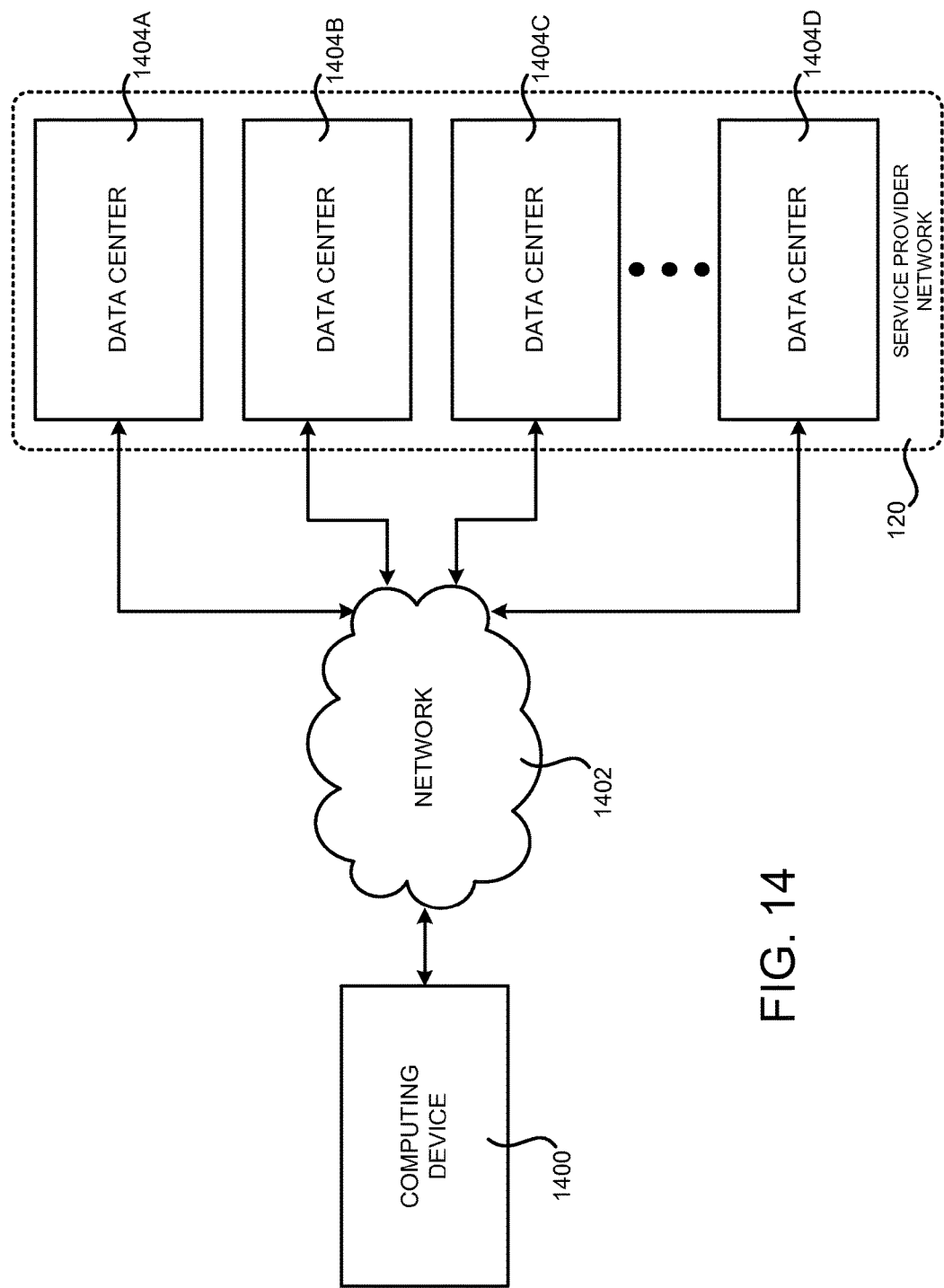
FIG. 14 is a system and network diagram that shows an illustrative operating environment that includes a service provider network that can be configured to implement aspects of the functionality described herein.

FIG. 14 is a system and network diagram that shows one illustrative operating environment for the configurations disclosed herein that includes a service provider network 120 that can be configured to provide functionality for optimized statistical machine translation in the manner described above, according to one configuration disclosed herein. As discussed above, the service provider network 120 can execute network services that provide computing resources on a permanent or an as-needed basis. Among other types of functionality, the computing resources provided by the service provider network 120 can be utilized to implement the various network services described herein. As also discussed above, the computing resources provided by the service provider network 120 can include various types of computing resources, such as data processing resources like VM instances, data storage resources, networking resources, data communication resources, network services, and the like.

Each type of computing resource provided by the service provider network 120 can be general-purpose or can be available in a number of specific configurations. For example, data processing resources can be available as physical computers or VM instances in a number of different configurations. The VM instances can be configured to execute applications, including Web servers, application servers, media servers, database servers, some or all of the network services described above, and/or other types of programs. Data storage resources can include file storage devices, block storage devices, and the like. The service provider network 120 might also be configured to provide other types of computing resources not mentioned specifically herein.

As also discussed above, the computing resources provided by the service provider network 120 are enabled in one implementation by one or more data centers 1404A-1404D (which might be referred herein singularly as "a data center 1404" or in the plural as "the data centers 1404"). The data centers 1404 are facilities utilized to house and operate computer systems and associated components. The data centers 1404 typically include redundant and backup power, communications, cooling, and security systems. The data centers 1404 can also be located in geographically disparate locations. One illustrative configuration for a data center 1404 that might be utilized to implement the technologies disclosed herein will be described below with regard to FIG. 15.

The customers and other users of the service provider network 120 can access the computing resources provided by the service provider network 120 over a network 1402, which can be a wide area communication network ("WAN"), such as the Internet, an intranet or an Internet service provider ("ISP") network or a combination of such networks. For example, and without limitation, a computing device 1400 operated by a customer or other user of the service provider network 120 might be utilized to access the service provider network 120 by way of the network 1402. It should be appreciated that a local-area network ("LAN"), the Internet, or any other networking topology known in the art that connects the data centers 1404 to remote customers and other users can be utilized. It should also be appreciated that combinations of such networks might also be utilized.

Figure 15:
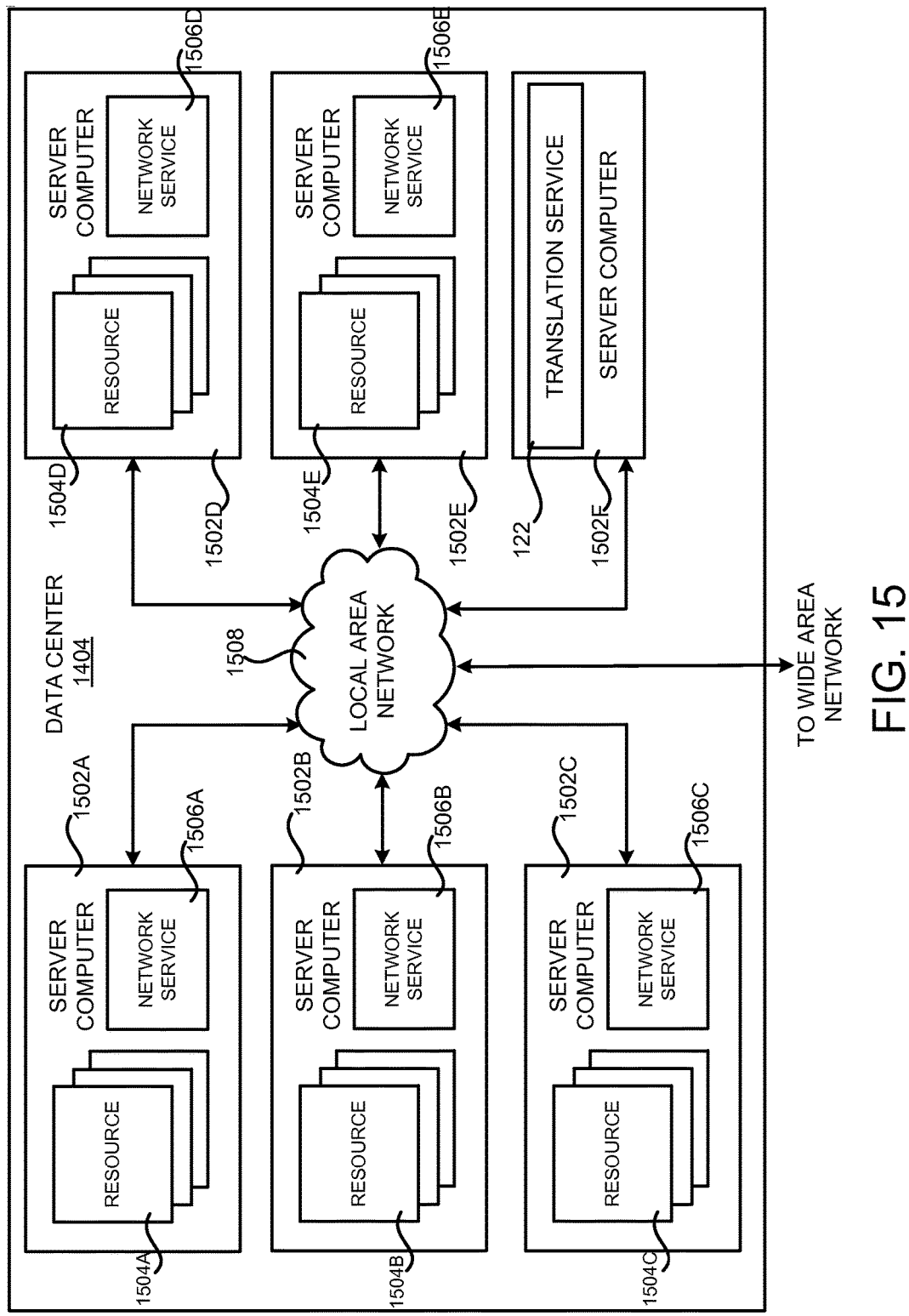
FIG. 15 is a computing system diagram illustrating a configuration for a data center that can be utilized to implement aspects of the technologies disclosed herein.

FIG. 15 is a computing system diagram that illustrates one configuration for a data center 1404 that implements aspects of the technologies disclosed herein for optimized statistical machine translation. The example data center 1404 shown in FIG. 15 includes several server computers 1502A-1502F (which might be referred to herein singularly as "a server computer 1502" or in the plural as "the server computers 1502") for providing the computing resources 1504A-1504E.

The server computers 1502 can be standard tower, rack-mount, or blade server computers configured appropriately for providing the computing resources 1504 described herein (illustrated in FIG. 15 as the computing resources 1504A-1504E). As mentioned above, the computing resources 1504 provided by the service provider network 120 might be data processing resources such as VM instances or hardware computing systems, data storage resources, database resources, networking resources, and others. Some of the servers 1502 might also be configured to execute network services 1506A-1506E, respectively, capable of instantiating, providing and/or managing the computing resources 1504, some of which are described in detail below with regard to FIG. 16.

The data center 1404 shown in FIG. 15 also includes a server computer 1502F that can execute some or all of the software components described above. For example, and without limitation, the server computer 1502F might be configured to execute the translation service 122, which was described in detail above. The server computer 1502F might also be configured to execute other components and/or to store data for providing some or all of the functionality described herein. In this regard, it should be appreciated that the translation service 122 might execute on many other physical or virtual servers in the data centers 1404 in various configurations.

In the example data center 1404 shown in FIG. 15, an appropriate LAN 1508 is also utilized to interconnect the server computers 1502A-1502F. The LAN 1508 is also connected to the network 1402 illustrated in FIG. 14. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components might also be utilized for balancing a load between each of the data centers 1404A-1404D, between each of the server computers 1502A-1502F in each data center 1404, and, potentially, between computing resources 1504 in each of the data centers 1404. It should be appreciated that the configuration of the data center 1404 described with reference to FIG. 15 is merely illustrative and that other implementations might be utilized.

Figure 16:
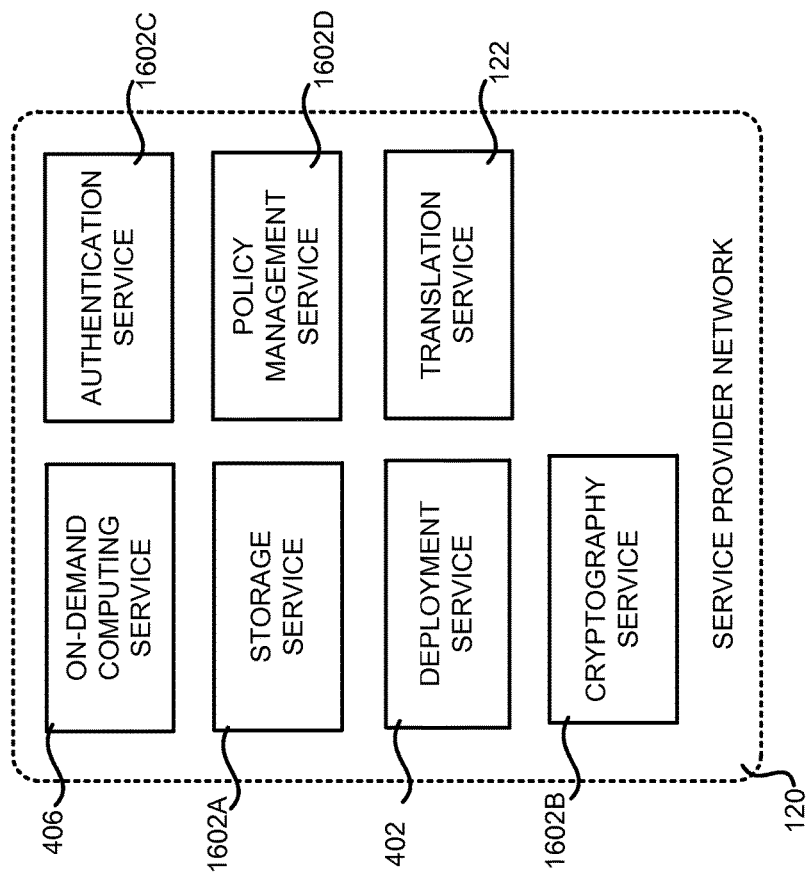
FIG. 16 is a network services diagram that shows aspects of several services that might be provided by and utilized within a service provider network configured to implement the various technologies disclosed herein.

FIG. 16 is a system and network diagram that shows aspects of several network services that might be provided by and utilized within a service provider network 120 in one configuration disclosed herein. In particular, and as discussed above, the service provider network 120 can provide a variety of network services to customers and other users of the service provider network 120 including, but not limited to, the on-demand computing service 406, the translation service 122, and the deployment service 402. The service provider network 120 might also provide other types of services including, but not limited to, a storage service 1602A, a cryptography service 1602B, an authentication service 1602C, and/or a policy management service 1602D, each of which is described in greater detail below. Additionally, the service provider network 120 might also provide other types of network services, some of which are described in greater detail below.

It should be appreciated that customers of the service provider network 120 can include organizations or individuals that utilize some or all of the services provided by the service provider network 120. As described above, a customer or other user can communicate with the service provider network 120 through a network, such as the network 1402 shown in FIG. 14. Communications from a customer computing device, such as the developer computing device 110 shown in FIG. 1, to the service provider network 120 can cause the services provided by the service provider network 120 to operate in accordance with the described configurations or variations thereof.

It is noted that not all configurations described include the services described with reference to FIG. 16 and that additional network services can be provided in addition to or as an alternative to the services explicitly described herein. Each of the services shown in FIG. 16 might also expose Web service interfaces that enable a caller to submit appropriately configured application programming interface ("API") calls to the various services through Web service requests. In addition, each of the services might include service interfaces that enable the services to access each other (e.g., to enable a virtual computer system provided by the on-demand computing service 406 to store data in or retrieve data from the storage service 1602A). Additional details regarding some of the services shown in FIG. 16 will now be provided.

As discussed above, the on-demand computing service 406 can be a collection of computing resources configured to instantiate VM instances or to provide other types of computing resources 1504 on demand. For example, a customer or other user of the service provider network 120 can interact with the on-demand computing service 406 (via appropriately configured and authenticated API calls, for example) to provision and operate VM instances that are instantiated on physical computing devices hosted and operated by the service provider network 120. The VM instances can be used for various purposes, such as to operate as servers supporting the network services described herein, a Web site, to operate business applications or, generally, to serve as computing resources for the customer. Other applications for the VM instances can be to support database applications, electronic commerce applications, business applications and/or other applications. Although the on-demand computing service 406 is shown in FIG. 16, any other computer system or computer system service can be utilized in the service provider network 120 to implement the functionality disclosed herein, such as a computer system or computer system service that does not employ virtualization and instead provisions computing resources on dedicated or shared computers/servers and/or other physical devices.

The storage service 1602A might include software and computing resources that collectively operate to store data using block or file-level storage devices (and/or virtualizations thereof). The storage devices of the storage service 1602A might, for example, be operationally attached to virtual computer systems provided by the on-demand computing service 406 to serve as logical units (e.g., virtual drives) for the computer systems. A storage device might also enable the persistent storage of data used/generated by a corresponding virtual computer system where the virtual computer system service might only provide ephemeral data storage.

The service provider network 120 can also include a cryptography service 1602B. The cryptography service 1602B can utilize storage services of the service provider network 120, such as the storage service 1602A, to store encryption keys in encrypted form, whereby the keys can be usable to decrypt customer keys accessible only to particular devices of the cryptography service 1602B. The cryptography service 1602B might also provide other types of functionality not specifically mentioned herein.

As illustrated in FIG. 16, the service provider network 120, in various configurations, also includes an authentication service 1602C and a policy management service 1602D. The authentication service 1602C, in one example, is a computer system (i.e., collection of computing resources 1504) configured to perform operations involved in authentication of users. For instance, one of the services shown in FIG. 16 can provide information from a user to the authentication service 1602C to receive information in return that indicates whether or not the requests submitted by the user are authentic.

The policy management service 1602D, in one example, is a network service configured to manage policies on behalf of customers or internal users of the service provider network 120. The policy management service 1602D can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 120 can additionally maintain other services based, at least in part, on the needs of its customers. For instance, the service provider network 120 can maintain the deployment service 402 for deploying program code and/or a database service (not shown in FIG. 16) for storing the class label data store 1202 in some configurations. A database service can be a collection of computing resources that collectively operate to create, maintain, and allow queries to be performed on databases stored within the service provider network 120. For example, a customer or other user of the service provider network 120 can operate and manage a database from the database service by utilizing appropriately configured network API calls. This, in turn, can allow the customer to maintain and potentially scale the operations in the database. Other services include object-level archival data storage services, and services that manage, monitor, interact with, or support other services. The service provider network 120 might also be configured with other network services not specifically mentioned herein in other configurations.

Figure 17:
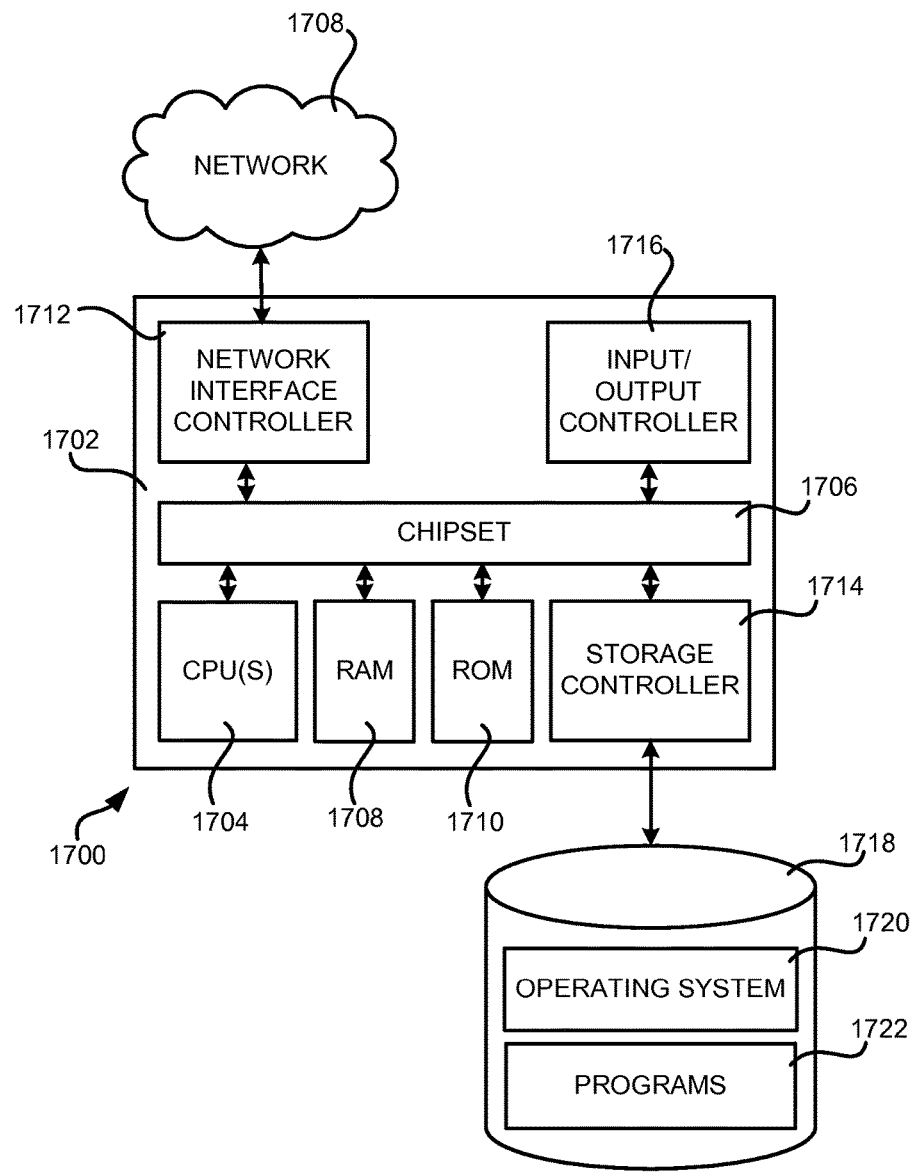
FIG. 17 is a computer architecture diagram showing an illustrative computer hardware architecture for implementing a computing device that might be utilized to implement aspects of the various technologies presented herein.

FIG. 17 shows an example computer architecture for a computer 1700 capable of executing program components for implementing the functionality described above. The computer architecture shown in FIG. 17 illustrates a conventional server computer, workstation, desktop computer, laptop, tablet, network appliance, e-reader, smartphone, or other computing device, and can be utilized to execute any of the software components presented herein.

The computer 1700 includes a baseboard 1702, or "motherboard," which is a printed circuit board to which a multitude of components or devices can be connected by way of a system bus or other electrical communication paths. In one illustrative configuration, one or more central processing units ("CPUs") 1704 operate in conjunction with a chipset 1706. The CPUs 1704 can be standard programmable processors that perform arithmetic and logical operations necessary for the operation of the computer 1700.

The CPUs 1704 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1706 provides an interface between the CPUs 1704 and the remainder of the components and devices on the baseboard 1702. The chipset 1706 can provide an interface to a RAM 1708, used as the main memory in the computer 1700. The chipset 1706 can further provide an interface to a computer-readable storage medium such as a read-only memory ("ROM") 1710 or non-volatile RAM ("NVRAM") for storing basic routines that help to startup the computer 1700 and to transfer information between the various components and devices. The ROM 1710 or NVRAM can also store other software components necessary for the operation of the computer 1700 in accordance with the configurations described herein.

The computer 1700 can operate in a networked environment using logical connections to remote computing devices and computer systems through a network, such as the network 1708. The chipset 1706 can include functionality for providing network connectivity through a NIC 1712, such as a gigabit Ethernet adapter. The NIC 1712 is capable of connecting the computer 1700 to other computing devices over the network 1708. It should be appreciated that multiple NICs 1712 can be present in the computer 1700, connecting the computer to other types of networks and remote computer systems.

The computer 1700 can be connected to a mass storage device 1718 that provides non-volatile storage for the computer. The mass storage device 1718 can store an operating system 1720, programs 1722, and data, which have been described in greater detail herein. The mass storage device 1718 can be connected to the computer 1700 through a storage controller 1714 connected to the chipset 1706. The mass storage device 1718 can consist of one or more physical storage units. The storage controller 1714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1700 can store data on the mass storage device 1718 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1718 is characterized as primary or secondary storage, and the like.

For example, the computer 1700 can store information to the mass storage device 1718 by issuing instructions through the storage controller 1714 to alter the magnetic characteristics of a particular location within a magnetic disk drive unit, the reflective or refractive characteristics of a particular unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1700 can further read information from the mass storage device 1718 by detecting the physical states or characteristics of one or more particular locations within the physical storage units.

In addition to the mass storage device 1718 described above, the computer 1700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1718 can store an operating system 1720 utilized to control the operation of the computer 1700. According to one configuration, the operating system comprises the LINUX operating system. According to another configuration, the operating system comprises the WINDOWS® SERVER operating system from MICROSOFT CORPORATION. According to further configurations, the operating system can comprise the UNIX operating system or one of its variants. It should be appreciated that other operating systems can also be utilized. The mass storage device 1718 can store other system or application programs and data utilized by the computer 1700.

In one configuration, the mass storage device 1718 or other computer-readable storage media is encoded with computer-executable instructions which, when loaded into the computer 1700, transform the computer from a general-purpose computing system into a special-purpose computer capable of implementing the configurations described herein. These computer-executable instructions transform the computer 1700 by specifying how the CPUs 1704 transition between states, as described above. According to one configuration, the computer 1700 has access to computer-readable storage media storing computer-executable instructions which, when executed by the computer 1700, perform the various processes described above with regard to FIGS. 1-13. The computer 1700 might also include computer-readable storage media for performing any of the other computer-implemented operations described herein.

The computer 1700 can also include one or more input/output controllers 1716 for receiving and processing input from a number of input devices, such as a keyboard, a mouse, a touchpad, a touch screen, an electronic stylus, or other type of input device. Similarly, an input/output controller 1716 can provide output to a display, such as a computer monitor, a flat-panel display, a digital projector, a printer, a plotter, or other type of output device. It will be appreciated that the computer 1700 might not include all of the components shown in FIG. 17, can include other components that are not explicitly shown in FIG. 17, or might utilize an architecture completely different than that shown in FIG. 17.

The disclosure presented herein also encompasses the subject matter set forth in the various clauses, below:

Clause 1A: An apparatus, comprising: a processor; and a non-transitory computer-readable storage medium having instructions stored thereupon which are executable by the processor and which, when executed, cause the apparatus to: utilize domain-specific client training data in a source language and a target language to generate a dynamic client data translation model; utilize non-domain-specific background training data in the source language and the target language to generate a dynamic background data translation model; utilize the domain-specific client training data in the target language to generate a client language model; utilize the non-domain-specific background training data in the target language to generate a background language model; perform large-scale discriminative training on client tuning data to learn model weights associated with feature scores for candidate translations generated using the dynamic client data translation model, the dynamic background data translation model, the client language model, and the background language model; generate a translation package comprising the dynamic client data translation model, the dynamic background data translation model, the client language model, the background language model, and the model weights; and deploy the translation package to one or more host computers in a service provider network for use in translating input segments in the source language to the target language.

Clause 2A: The apparatus of clause 1A, wherein the dynamic client data translation model and the dynamic background data translation model comprise suffix array data structures.

Clause 3A: The apparatus of clauses 1A-2A, wherein the non-transitory computer-readable storage medium has further instructions stored thereupon to: utilize the domain-specific client training data in the target language and the non-domain-specific background training data in the target language to generate a cluster map; and utilize the cluster map to generate a cluster-based language model for the target language, wherein the translation package further comprises the cluster map, the cluster-based language model and one or more model weights associated with feature scores generated by the cluster-based language model for candidate translations.

Clause 4A: The apparatus of clauses 1A-3A, wherein the cluster map is generated utilizing Brown clustering.

Clause 5A: The apparatus of clauses 1A-4A, wherein the non-transitory computer-readable storage medium has further instructions stored thereupon to: utilize the client training data and the background training data to generate a combined translation model, and wherein the translation package further comprises the combined translation model and one or more model weights associated with the combined translation model.

Clause 6A: The apparatus of clauses 1A-5A, wherein the non-transitory computer-readable storage medium has further instructions stored thereupon to: utilize the client training data and the background training data in the target language to generate a combined language model, and wherein the translation package further comprises the combined language model and one or more model weights associated with the combined language model.

Clause 7A: The apparatus of clauses 1A-6A, wherein the non-transitory computer-readable storage medium has further instructions stored thereupon to: receive a request to translate an input segment in the source language into the target language; utilize the dynamic client data translation model to generate one or more candidate translations for phrases in the input segment, the candidate translations having associated feature scores; utilize the dynamic background data translation model to generate one or more candidate translations for phrases in the input segment, the candidate translations having associated feature scores; utilize the client language model and the background language model to generate feature scores for the candidate translations; apply the model weights to the feature scores generated by the dynamic client data translation model, the dynamic background data translation model, the client language model and the background language model to generate weighted feature scores; and utilize the weighted feature scores to select a plurality of the candidate translations which, when combined, comprise a translation of the input segment in the target language.

Clause 8A: The apparatus of clauses 1A-7A, wherein the non-transitory computer-readable storage medium has further instructions stored thereupon to: utilize a machine translation quality classifier to classify a quality of the translation of the input segment into one of a plurality of classes; and to retranslate the input segment based, at least in part, upon the classification of the quality of the translation of the input segment into the one of the plurality of classes.

Clause 9A: A computer-implemented method for statistical machine translation, the method comprising: generating a first dynamic translation model using out-of-domain training data; generating a second dynamic translation model using in-domain training data; generating a first language model using the out-of-domain training data in a target language; generating a second language model using the in-domain training data in the target language; generating model weights for the first and second dynamic translation models and the first and second language models using large-scale discriminative training; generating a translation package comprising the first and second dynamic translation models, the first and second language models, and the model weights; and deploying the translation package to one or more host computers in a service provider network for use in translating input segments in a source language to the target language.

Clause 10A: The computer-implemented method of clause 9A, further comprising: generating a cluster map using the in-domain training data in the target language and the out-of-domain training data in the target language; and generating a cluster-based language model using the cluster map, wherein the translation package further comprises the cluster map, the cluster-based language model and one or more model weights associated with the cluster-based language model.

Clause 11A: The computer-implemented method of clauses 9A-10A, wherein the in-domain training data is extracted from the out-of-domain training data.

Clause 12A: The computer-implemented method of clauses 9A-11A, further comprising: generating a combined translation model and a combined language model utilizing the in-domain training data and the out-of-domain training data, and wherein the translation package further comprises the combined translation model, the combined language mode, and one or more model weights associated with the combined translation model and the combined language model.

Clause 13A: The computer-implemented method of clauses 9A-12A, further comprising: receiving a request to translate an input segment in the source language into the target language; generating one or more candidate translations for phrases in the input segment using the first dynamic translation model and the second dynamic translation model, the candidate translations having associated feature scores; generating feature scores for the candidate translations using the first and second language models; generating weighted feature scores using the model weights; and combining a plurality of the candidate translations as a translation of the input segment in the target language that are selected based, at least in part, on the weighted feature scores.

Clause 14A: The computer-implemented method of clauses 9A-13A, wherein the request to translate the input segment is received at a network service executing in the service provider network.

Clause 15A: A non-transitory computer-readable storage medium having instructions stored thereupon which are executable by a processor and which, when executed, cause the processor to: generate a first dynamic translation model using out-of-domain training data; generate a second dynamic translation model using in-domain training data; generate a first language model using the out-of-domain training data in a target language; generate a second language model using the in-domain training data in the target language; and generate model weights for the first and second dynamic translation models and the first and second language models using large-scale discriminative training.

Clause 16A: The non-transitory computer-readable storage medium of clause 15A, wherein the non-transitory computer-readable storage medium has further instructions stored thereupon to: generate a translation package comprising the first and second dynamic translation models, the first and second language models, and the model weights; and cause the translation package to be deployed to one or more host computers in a service provider network.

Clause 17A: The non-transitory computer-readable storage medium of clauses 15A-16A, wherein the large-scale discriminative training is implemented utilizing a margin infused relaxed algorithm (MIRA).

Clause 18A: The non-transitory computer-readable storage medium of clauses 15A-17A, wherein the non-transitory computer-readable storage medium has further instructions stored thereupon to: generate a cluster map using the in-domain training data in the target language and the out-of-domain training data in the target language; and use the cluster map to generate a cluster-based language model.

Clause 19A: The non-transitory computer-readable storage medium of clauses 15A-18A, wherein the cluster map is generated utilizing Brown clustering.

Clause 20A: The non-transitory computer-readable storage medium of clauses 15A-19A, wherein the non-transitory computer-readable storage medium has further instructions stored thereupon to: receive a request to translate an input segment in a source language into the target language; generate one or more candidate translations for phrases in the input segment using the first dynamic translation model and the second dynamic translation model, the candidate translations having associated feature scores; generate feature scores for the candidate translations using the first and second language models; generate weighted feature scores using the model weights; and combine a plurality of the candidate translations as a translation of the input segment in the target language that are selected based, at least in part, on the weighted feature scores.

Clause 21A: The non-transitory computer-readable storage medium of clauses 15A-20A, wherein the non-transitory computer-readable storage medium has further instructions stored thereupon to: utilize a machine translation quality classifier to classify a quality of translated segments generated by the translation package into one of a plurality of classes comprising a near perfect class, an understandable class, and a residual class; discard translated segments classified in the residual class; and cause input segments associated with one or more translated segments in the residual class to be retranslated using a dedicated cluster of instances of a statistical machine translation system configured to examine broad segments of text that are compute intensive and statistically complex.

Clause 22A: The non-transitory computer-readable storage medium of clauses 15A-21A, wherein the non-transitory computer-readable storage medium has further instructions stored thereupon to: calculate a compute cost associated with retranslating one or more translated segments in a residual class using a dedicated cluster of instances of a statistical machine translation system configured to examine broad segments of text that are compute intensive and statistically complex; determine that the compute cost associated with translating the one or more translated segments in the residual class exceeds a cost associated with retranslating the one or more translated segments using a human post-editor; and cause the translated segments in the residual class to be provided to the dedicated cluster of instances or the human post-editor for retranslation based, at least in part, upon the determination that the compute cost exceeds the cost associated with retranslating the one or more translated segments using the human post-editor.

Clause 1B: An apparatus, comprising: a processor; and a non-transitory computer-readable storage medium having instructions stored thereupon which are executable by the processor and which, when executed, cause the apparatus to: receive a batch of incremental client training data; perform word alignment on the batch of incremental client training data using a previously generated word alignment model; add the batch of incremental client training data to a previously generated dynamic client data translation model to create an updated dynamic client data translation model; utilize the batch of incremental client training data to generate an updated client language model; utilize the incremental client training data to generate an updated cluster-based language model; perform large-scale discriminative training to generate updated model weights for the updated dynamic client data translation model, the updated cluster-based language model, and the updated client language model; create a translation package comprising the updated dynamic client data translation model, the updated client language model, the updated cluster-based language model, and the updated model weights; and cause the translation package to be deployed to one or more host computers in a service provider network in place of a previously deployed translation package.

Clause 2B: The apparatus of clause 1B, wherein the previously generated word alignment model is created in association with an initial creation of the previously deployed translation package.

Clause 3B: The apparatus of clauses 1B-2B, wherein the non-transitory computer-readable storage medium has further instructions stored thereupon to: perform comparative testing between the translation package and the previously deployed translation package; and cause the translation package to be deployed based, at least in part, on results of the comparative testing.

Clause 4B: The apparatus of clauses 1B-3B, wherein the incremental client training data comprises one or more translations generated by the previously deployed translation package that have been post-edited.

Clause 5B: The apparatus of clauses 1B-4B wherein the updated dynamic client data translation model is implemented using a suffix array data structure.

Clause 6B: The apparatus of clauses 1B-5B, wherein the large-scale discriminative training is performed utilizing a margin infused relaxed algorithm (MIRA).

Clause 7B: A computer-implemented method for updating a translation package for performing statistical machine translation, the method comprising: performing word alignment on a batch of incremental client training data using a previously generated word alignment model; creating an updated dynamic client data translation model by adding the batch of word-aligned incremental client training data to a previously generated dynamic client data translation model; and creating an updated translation package comprising the updated dynamic client data translation model.

Clause 8B: The computer-implemented method of clause 7B, further comprising generating an updated client language model utilizing the incremental client training data, and wherein the updated translation package further comprises the updated client language model.

Clause 9B: The computer-implemented method of clauses 7B-8B, further comprising performing large-scale discriminative training to generate updated model weights for the updated dynamic client data translation model and the updated client language model, and wherein the updated translation package further comprises the updated model weights.

Clause 10B: The computer-implemented method of clauses 7B-9B, wherein the large-scale discriminative training is performed utilizing a margin infused relaxed algorithm (MIRA).

Clause 11B: The computer-implemented method of clauses 7B-10B, further comprising: generating an updated cluster-based language model using the batch of incremental client training data; performing large-scale discriminative training to generate updated model weights for the updated cluster-based language model; and adding the updated cluster-based language model and the updated model weights for the updated cluster-based language model to the updated translation package.

Clause 12B: The computer-implemented method of clauses 7B-11B, further comprising causing the updated translation package to be deployed to one or more host computers in a service provider network in place of a previously deployed translation package.

Clause 13B: The computer-implemented method of clauses 7B-12B, further comprising: performing comparative testing between the updated translation package and a previously deployed translation package; and causing the updated translation package to be deployed based, at least in part, on results of the comparative testing.

Clause 14B: The computer-implemented method of clauses 7B-13B, wherein the batch of incremental client training data comprises one or more translations generated by the previously deployed translation package that have been post-edited.

Clause 15B: The computer-implemented method of clauses 7B-14B, wherein the updated dynamic client data translation model is implemented using a suffix array data structure.

Clause 16B: A non-transitory computer-readable storage medium having instructions stored thereupon which are executable by a processor and which, when executed, cause the processor to: perform word alignment on a batch of incremental client training data using a previously generated word alignment model; create an updated dynamic client data translation model by adding the batch of word-aligned incremental client training data to a previously generated dynamic client data translation model; and create an updated translation package comprising the updated dynamic client data translation model.

Clause 17B: The non-transitory computer-readable storage medium of clause 16B, wherein the non-transitory computer-readable storage medium has further instructions stored thereupon to: perform comparative testing between the updated translation package and a previously deployed translation package; and cause the updated translation package to be deployed based, at least in part, on results of the comparative testing.

Clause 18B: The non-transitory computer-readable storage medium of clauses 16B-17B, wherein the non-transitory computer-readable storage medium has further instructions stored thereupon to: generate an updated client language model using the batch of incremental client training data; and add the updated client language model to the updated translation package.

Clause 19B: The non-transitory computer-readable storage medium of clauses 16B-18B, wherein the non-transitory computer-readable storage medium has further instructions stored thereupon to perform large-scale discriminative training to generate updated model weights for the updated dynamic client data translation model and the updated client language model and to add the updated model weights to the updated translation package.

Clause 20B: The non-transitory computer-readable storage medium of clauses 16B-19B, wherein the large-scale discriminative training is performed utilizing a margin infused relaxed algorithm (MIRA).

Clause 21B: The non-transitory computer-readable storage medium of clauses 16B-20B, wherein the non-transitory computer-readable storage medium has further instructions stored thereupon to: provide a user interface configured to display one or more translations generated by the previously deployed translation package to users of an e-commerce site; and provide, through the user interface, one or more user interface controls for permitting the users of the e-commerce site to create post-edited translations of the translations generated by the previously deployed translation package, and wherein the batch of incremental client training data comprises the post-edited translations created by the users of the e-commerce site.

Clause 22B: The non-transitory computer-readable storage medium of clauses 16B-21B, wherein the non-transitory computer-readable storage medium has further instructions stored thereupon to: utilize a machine translation quality classifier to classify a quality of translated segments generated by the updated translation package and a previously deployed translation package into one of a plurality of classes comprising a near perfect class, an understandable class, and a residual class; discard translated segments classified in the residual class; and cause input segments associated with one or more translated segments in the residual class to be retranslated using a dedicated cluster of instances of a statistical machine translation system configured to examine broad segments of text that are compute intensive and statistically complex.

Clause 23B: The non-transitory computer-readable storage medium of clauses 16B-22B, wherein the non-transitory computer-readable storage medium has further instructions stored thereupon to: calculate a compute cost associated with retranslating one or more translated segments in a residual class using a dedicated cluster of instances of a statistical machine translation system configured to examine broad segments of text that are compute intensive and statistically complex; determine that the compute cost associated with translating the one or more translated segments in the residual class exceeds a cost associated with retranslating the one or more translated segments using a human post-editor; and cause the translated segments in the residual class to be provided to the dedicated cluster of instances or the human post-editor for retranslation based, at least in part, upon the determination that the compute cost exceeds the cost associated with retranslating the one or more translated segments using the human post-editor.

Clause 1C: An apparatus, comprising: a processor; and a non-transitory computer-readable storage medium having instructions stored thereupon which are executable by the processor and which, when executed, cause the apparatus to: modify a misclassification cost associated with a supervised machine learning model to offset an imbalance between a plurality of classes of training data utilized to train a machine translation quality classifier to classify a quality of machine translated text segments; modify a loss function associated with the supervised machine learning model to penalize a misclassification of a lower-quality text segment as a higher-quality text segment more greatly than a misclassification of a higher-quality text segment as a lower-quality text segment; and cause the machine translation quality classifier to be deployed to a service provider network, whereby the machine translation quality classifier is utilized to classify a quality of translated segments received from a machine translation system operating in the service provider network into one of the plurality of classes in real time.

Clause 2C: The apparatus of clause 1C, wherein the plurality of classes comprises a perfect or near perfect class, an understandable class, and a residual class.

Clause 3C: The apparatus of clauses 1C-2C, wherein the non-transitory computer-readable storage medium has further instructions stored thereupon to: aggregate a plurality of classifications for translated segments; and generate one or more document-level or corpus-level distribution statistics based upon the aggregated classifications.

Clause 4C: The apparatus of clauses 1C-3C, wherein the training data comprises one or more feature scores associated with machine translated text segments in a target language and correct class labels for the machine translated text segments in the target language.

Clause 5C: The apparatus of clauses 1C-4C, wherein the correct class labels for the machine translated text segments in the target language are generated, at least in part, based upon a translation edit rate ("TER") between the machine translated text segments in the target language and associated reference translations.

Clause 6C: The apparatus of clauses 1C-5C, wherein the feature scores associated with the machine translated text segments in the target language comprise one or more of a fluency of the machine translated text segments, a level of ambiguity experienced by the machine translation system in translating the input text segments, an estimated difficulty of the machine translation system in translating the input text segments, a difference in length or punctuation between the input text segments and the machine translated text segments, or one or more statistical confidence measures generated by the machine translation system for the machine translated text segments.

Clause 7C: A computer-implemented method for classifying a quality of translated segments generated by a machine translation system, the method comprising: training a machine translation quality classifier to classify the quality of the translated segments utilizing a supervised machine learning model configured with a misclassification cost configured to offset an imbalance between a plurality of classes of training data and a loss function configured to penalize a misclassification of a lower-quality translated segment as a higher-quality translated segment more greatly than a misclassification of a higher-quality translated segment as a lower-quality translated segment; and utilizing the machine translation quality classifier to classify the quality of the translated segments generated by the machine translation system into the plurality of classes.

Clause 8C: The computer-implemented method of clause 7C, wherein the training data comprises one or more feature scores associated with machine translated segments in a target language and correct class labels for the machine translated segments in the target language.

Clause 9C: The computer-implemented method of clause 7C-8C, wherein the correct class labels for the machine translated segments in the target language are generated, at least in part, based upon a translation edit rate ("TER") between the machine translated segments in the target language and associated reference translations.

Clause 10C: The computer-implemented method of clause 7C-9C, wherein the feature scores associated with the machine translated segments in the target language comprise one or more of a fluency of the machine translated segments, a level of ambiguity experienced by the machine translation system in translating the input text segments, an estimated difficulty of the machine translation system in translating the input text segments, a difference in length or punctuation between the input text segments and the machine translated text segments, or one or more statistical confidence measures generated by the machine translation system for the machine translated text segments.

Clause 11C: The computer-implemented method of clause 7C-10C, further comprising: aggregating a plurality of classifications for translated segments; and generating one or more document-level or corpus-level distribution statistics based upon the aggregated classifications.

Clause 12C: The computer-implemented method of clause 7C-11C, further comprising initiating one or more actions based, at least in part, on the document-level or corpus-level distribution statistics.

Clause 13C: The computer-implemented method of clause 7C-12C, wherein the plurality of classes comprises a perfect or near perfect class, an understandable class, and a residual class.

Clause 14C: The computer-implemented method of clauses 7C-13C, further comprising providing translated segments in the understandable class to an editor for post-editing.

Clause 15C: The computer-implemented method of clauses 7C-14C, further comprising: discarding translated segments in the residual class; and providing input segments associated with translated segments in the residual class to an editor for translation.

Clause 16C: The computer-implemented method of clauses 7C-15C, further comprising: discarding translated segments in the residual class; and retranslating input segments associated with translated segments in the residual class using a dedicated cluster of instances of a statistical machine translation system configured to examine broad segments of text that are compute intensive and statistically complex.

Clause 17C: The computer-implemented method of clauses 7C-16C, further comprising: calculating a compute cost associated with retranslating one or more translated segments in the residual class using a dedicated cluster of instances of a statistical machine translation system configured to examine broad segments of text that are compute intensive and statistically complex; determining that the compute cost associated with translating the one or more translated segments in the residual class exceeds a cost associated with retranslating the one or more translated segments using a human post-editor; and causing the translated segments in the residual class to be provided to the dedicated cluster of instances or the human post-editor for retranslation based, at least in part, upon the determination that the compute cost exceeds the cost associated with retranslating the one or more translated segments using the human post-editor.

Clause 18C: A non-transitory computer-readable storage medium having instructions stored thereupon which are executable by a processor and which, when executed, cause the processor to: train a machine translation quality classifier to classify the quality of the translated segments utilizing a supervised machine learning model configured with a misclassification cost configured to offset an imbalance between a plurality of classes of training data and a loss function configured to penalize a misclassification of a lower-quality translated segment as a higher-quality translated segment more greatly than a misclassification of a higher-quality translated segment as a lower-quality translated segment; and utilize the machine translation quality classifier to classify the quality of the translated segments generated by the machine translation system into the plurality of classes.

Clause 19C: The non-transitory computer-readable storage medium of clause 18C, wherein the machine translation quality classifier is further configured to receive an indication as to whether a term dictionary was utilized to translate at least a portion of the translated segments, and to utilize the indication as to whether a term dictionary was utilized to translate at least a portion of the translated segments, at least in part, to classify the quality of the translated segments generated by the machine translation system into the plurality of classes.

Clause 20C: The non-transitory computer-readable storage medium of clauses 18C-19C, wherein the machine translation quality classifier is trained using training data comprising correct class labels for machine translated segments in a target language that have been generated, at least in part, based upon a translation edit rate ("TER") between the machine translated segments in the target language and associated reference translations.

Clause 21C: The non-transitory computer-readable storage medium of clauses 18C-20C, wherein the training data further comprises feature scores associated with the machine translated segments in the target language, the feature scores comprising one or more of a fluency of the machine translated segments, a level of ambiguity experienced by the machine translation system in translating the input text segments, an estimated difficulty of the machine translation system in translating the input text segments, a difference in length or punctuation between the input text segments and the machine translated text segments, or one or more statistical confidence measures generated by the machine translation system for the machine translated text segments.

Clause 22C: The non-transitory computer-readable storage medium of clauses 18C-21C, having further instructions stored thereupon to retrain the machine translation quality classifier in conjunction with the retraining of a statistical machine translation system.

Based on the foregoing, it should be appreciated that technologies for optimized statistical translation have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. An apparatus, comprising:
   one or more processors; and
   one or more non-transitory computer-readable storage media having instructions stored thereupon which are executable by the one or more processors and which, when executed, cause the apparatus to:
      generate a word alignment model based at least in part on client training data;
      generate a first version of a translation package based, at least in part, on the word alignment model;
      deploy the first version of the translation package within a service provider network, wherein the first version of the translation package is configured to provide translations for one or more customers of the service provider network;

receive a batch of incremental client training data, wherein the incremental client training data includes post-edited translations of one or more translations generated by the first version of the translation package deployed within the service provider network;

perform word alignment on the batch of incremental client training data using the word alignment model used to generate the first version of the translation package;

add the batch of incremental client training data to a previously generated dynamic client data translation model to create an updated dynamic client data translation model;

utilize the batch of incremental client training data to generate an updated client language model;

utilize the incremental client training data to generate an updated cluster-based language model;

perform large-scale discriminative training to generate updated model weights for the updated dynamic client data translation model, the updated cluster-based language model, and the updated client language model;

create a second version of the translation package comprising the updated dynamic client data translation model, the updated client language model, the updated cluster-based language model, and the updated model weights;

cause the second version of the translation package to be deployed to one or more host computers in the service provider network in place of the first version of the translation package; and utilize the second translation package to provide translations to one or more customers of the service provider network.

2. The apparatus of claim 1, wherein the batch of incremental client training data is received after the first version of the translation package is deployed within the service provider network.

3. The apparatus of claim 1, wherein the non-transitory computer-readable storage media has further instructions stored thereupon to:

perform comparative testing between the first version of the translation package and the and the second version of the translation package; and wherein cause the second version of the translation package to be deployed is based, at least in part, on results of the comparative testing.

4. The apparatus of claim 1, wherein the post-edited translations include edits to machine translations of input segments provided by the first version of the translation package.

5. The apparatus of claim 1, wherein the updated dynamic client data translation model is implemented using a suffix array data structure.

6. The apparatus of claim 1, wherein the large-scale discriminative training is performed utilizing a margin infused relaxed algorithm (MIRA).

7. A computer-implemented method for updating a translation package for performing statistical machine translation, the method comprising:

generating a word alignment model based at least in part on client training data;

generating a first version of a translation package based, at least in part, on the word alignment model;

performing word alignment on a batch of incremental client training data using the word alignment model associated with the first version of the translation package that has been deployed, wherein the incremental client training data includes post-edited translations of translations generated by the first version of the translation package;

creating an updated dynamic client data translation model by adding the batch of word-aligned incremental client training data to a previously generated dynamic client data translation model;

creating a second version of the translation package comprising the updated dynamic client data translation model;

causing the second version of the translation package to be deployed in place of the first version of the translation package; and utilizing the second translation package to provide translations.

8. The computer-implemented method of claim 7, further comprising generating an updated client language model utilizing the incremental client training data, and wherein the second version of the translation package further comprises the updated client language model.

9. The computer-implemented method of claim 8, further comprising performing large-scale discriminative training to generate updated model weights for the updated dynamic client data translation model and the updated client language model, and wherein the second version of the translation package further comprises the updated model weights.

10. The computer-implemented method of claim 9, wherein the large-scale discriminative training is performed utilizing a margin infused relaxed algorithm (MIRA).

11. The computer-implemented method of claim 7, further comprising:

generating an updated cluster-based language model using the batch of incremental client training data;

performing large-scale discriminative training to generate updated model weights for the updated cluster-based language model; and adding the updated cluster-based language model and the updated model weights for the updated cluster-based language model to the second version of the translation package.

12. The computer-implemented method of claim 7, wherein causing the second version of the translation package to be deployed, comprises deploying the second version of the translation package to one or more host computers in a service provider network in place of the first version of the translation package.

13. The computer-implemented method of claim 7, further comprising:

performing comparative testing between the first version of the translation package and the second version of the translation package; and causing the second version of the translation package to be deployed based, at least in part, on results of the comparative testing.

14. The computer-implemented method of claim 7, wherein the batch of incremental client training data comprises edits to machine translations of input segments provided by the first version of the translation package.

15. The computer-implemented method of claim 7, wherein the updated dynamic client data translation model is implemented using a suffix array data structure.

16. One or more non-transitory computer-readable storage media having instructions stored thereupon which are executable by one or more processors and which, when executed, cause the one or more processors to:

generate a word alignment model based at least in part on client training data;
generate a first version of a translation package based, at least in part, on the word alignment model;
perform word alignment on a batch of incremental client training data using the word alignment model used to generate the first version of the translation package, wherein the incremental client training data includes post-edited translations of translations generated by the first version of the translation package that has been deployed;
create an updated dynamic client data translation model by adding the batch of word-aligned incremental client training data to a previously generated dynamic client data translation model;
create a second version of the translation package comprising the updated dynamic client data translation model;
cause the second version of the translation package to be deployed to one or more host computers in place of the first version of the translation package; and
utilize the second translation package to provide translations.

17. The non-transitory computer-readable storage media of claim 16, having further instructions stored thereupon to:
perform comparative testing between the first version of the translation package and the second version of the translation package; and
wherein causing the second version of the translation package to be deployed is based, at least in part, on results of the comparative testing.

18. The non-transitory computer-readable storage media of claim 16, having further instructions stored thereupon to:
generate an updated client language model using the batch of incremental client training data; and
add the updated client language model to the second version of the translation package.

19. The non-transitory computer-readable storage media of claim 18, having further instructions stored thereupon to perform large-scale discriminative training to generate updated model weights for the updated dynamic client data translation model and the updated client language model and to add the updated model weights to the second version of the translation package.

20. The non-transitory computer-readable storage media of claim 16, wherein the large-scale discriminative training is performed utilizing a margin infused relaxed algorithm (MIRA).

21. The non-transitory computer-readable storage media of claim 16, having further instructions stored thereupon to:
provide a user interface configured to display one or more translations generated by the first version of the translation package to users of an e-commerce site; and
provide, through the user interface, one or more user interface controls for permitting the users of the e-commerce site to create the post-edited translations of the one or more translations generated by the first version of the translation package, and wherein
the batch of incremental client training data comprises the post-edited translations created by the users of the e-commerce site.

22. The non-transitory computer-readable storage media of claim 16, having further instructions stored thereupon to:
utilize a machine translation quality classifier to classify a quality of translated segments generated by the second version of the translation package and the first version of the translation package into one of a plurality of classes comprising a near perfect class, an understandable class, and a residual class;
discard translated segments classified in the residual class; and
cause input segments associated with one or more translated segments in the residual class to be retranslated using a dedicated cluster of instances of a statistical machine translation system configured to examine broad segments of text that are compute intensive and statistically complex.

23. The non-transitory computer-readable storage media of claim 16, having further instructions stored thereupon to:
calculate a compute cost associated with retranslating one or more translated segments in a residual class using a dedicated cluster of instances of a second statistical machine translation system configured to examine broad segments of text that are compute intensive and statistically complex;
determine that the compute cost associated with translating the one or more translated segments in the residual class exceeds a cost associated with retranslating the one or more translated segments by providing the one or more translated segments to a human post-editor by way of a computer-implemented user interface for translation; and
cause the translated segments in the residual class to be provided to the dedicated cluster of instances or the human post-editor for retranslation based, at least in part, upon the determination that the compute cost exceeds the cost associated with retranslating the one or more translated segments using the human post-editor.

* * * * *